(12) United States Patent
Srinivasan et al.

(10) Patent No.: US 12,223,257 B2
(45) Date of Patent: *Feb. 11, 2025

(54) SYSTEMS AND METHODS FOR GENERATING PERSONALIZED CONTENT

(71) Applicant: Adeia Guides Inc., San Jose, CA (US)

(72) Inventors: Madhusudhan Srinivasan, Bangalore (IN); Deviprasad Punja, Bangalore (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/414,899

(22) Filed: Jan. 17, 2024

(65) Prior Publication Data

US 2024/0152687 A1 May 9, 2024

Related U.S. Application Data

(63) Continuation of application No. 17/870,184, filed on Jul. 21, 2022, now Pat. No. 11,922,112, which is a
(Continued)

(51) Int. Cl.
*G06F 3/0486* (2013.01)
*G06F 16/28* (2019.01)
(Continued)

(52) U.S. Cl.
CPC .......... *G06F 40/134* (2020.01); *G06F 16/288* (2019.01); *G06F 16/9566* (2019.01); *G06F 40/295* (2020.01); *H04L 51/046* (2013.01)

(58) Field of Classification Search
CPC .. G06F 40/134; G06F 16/288; G06F 16/9566; G06F 40/295; G06F 40/30;
(Continued)

(56) References Cited

U.S. PATENT DOCUMENTS 6,526,426 B1 2/2003 Lakritz
6,621,892 B1 9/2003 Banister et al.
(Continued)

FOREIGN PATENT DOCUMENTS

CN 104969254 A 10/2015
CN 108156825 A 6/2018
(Continued)

*Primary Examiner* — Hassan Mrabi
(74) *Attorney, Agent, or Firm* — Haley Guiliano LLP

(57) ABSTRACT

The system receives a message having a sender and a recipient. The system identifies entities associated with the message and associated with any content that is associated with the message. The system determines whether to, and how to, modify the message based on relationship information among the sender, the recipient, and any entities identified in the message or components of the message. A relationship between a sender and recipient may be determined using, for example, a database of relationship information. The system modifies, for example, text, images, or video of the message to generate the personalized message. The personalized message include the original message along with context information to help indicate the relevance of the message to the recipient. The context information can include text, images, video, or other information. To illustrate, the context information can include keywords or identifiers that indicate entities associated with the message.

20 Claims, 13 Drawing Sheets

Related U.S. Application Data continuation of application No. 16/555,437, filed on Aug. 29, 2019, now Pat. No. 11,429,778.

(51) Int. Cl.
*G06F 16/955* (2019.01)
*G06F 40/134* (2020.01)
*G06F 40/295* (2020.01)
*H04L 51/046* (2022.01)

(58) Field of Classification Search
CPC ... G06F 40/56; G06F 16/9035; H04L 51/046; H04L 51/063; H04L 51/52
See application file for complete search history.

(56) References Cited

U.S. PATENT DOCUMENTS

| | | |
|---|---|---|
| 7,072,947 B1 | 7/2006 | Knox et al. |
| 7,475,109 B1 | 1/2009 | Fletcher et al. |
| 8,762,285 B2* | 6/2014 | Davis ............... H04L 51/214 705/319 |
| 9,042,923 B1 | 5/2015 | Mirho |
| 9,628,950 B1 | 4/2017 | Noeth et al. |
| 9,742,712 B2 | 8/2017 | Katis et al. |
| 10,050,915 B2* | 8/2018 | Abou Mahmoud .. H04L 51/063 |
| 10,231,285 B1 | 3/2019 | Reichart et al. |
| 10,674,563 B2 | 6/2020 | Reichart et al. |
| 10,791,433 B1 | 9/2020 | Harijan et al. |
| 10,827,071 B1 | 11/2020 | Adibi et al. |
| 10,893,009 B2* | 1/2021 | Everton ............... G06Q 10/107 |
| 10,896,593 B1* | 1/2021 | Nitsch ................. H04L 12/185 |
| 11,005,798 B2* | 5/2021 | Everton ................ H04L 51/23 |
| 11,429,778 B2 | 8/2022 | Srinivasan et al. |
| 2005/0267738 A1 | 12/2005 | Wilkinson et al. |
| 2007/0054678 A1 | 3/2007 | Doulton |
| 2007/0118592 A1* | 5/2007 | Bachenberg ........... H04L 67/53 725/74 |
| 2007/0143410 A1 | 6/2007 | Kraft et al. |
| 2008/0059656 A1 | 3/2008 | Saliba et al. |
| 2008/0120410 A1 | 5/2008 | Quoc et al. |
| 2010/0057870 A1 | 3/2010 | Ahn et al. |
| 2010/0199287 A1* | 8/2010 | Boda ..................... H04M 3/42 718/108 |
| 2010/0269049 A1 | 10/2010 | Fearon |
| 2011/0276396 A1 | 11/2011 | Rathod |
| 2012/0112449 A1 | 5/2012 | Engel et al. |
| 2012/0117177 A1 | 5/2012 | Lu et al. |
| 2012/0136943 A1 | 5/2012 | Paul et al. |
| 2012/0144300 A1 | 6/2012 | Harm |
| 2013/0254213 A1 | 9/2013 | Cheng et al. |
| 2013/0254305 A1 | 9/2013 | Cheng et al. |
| 2013/0275881 A1 | 10/2013 | Hahm et al. |
| 2014/0059443 A1 | 2/2014 | Tabe |
| 2014/0164529 A1* | 6/2014 | Kleppmann ......... H04L 51/063 709/206 |
| 2014/0164533 A1 | 6/2014 | Lynch et al. |
| 2014/0164953 A1 | 6/2014 | Lynch et al. |
| 2014/0280614 A1* | 9/2014 | Alakuijala ............. H04L 51/52 709/206 |
| 2015/0154185 A1 | 6/2015 | Waibel |
| 2015/0156220 A1 | 6/2015 | Baskaran |
| 2015/0172242 A1* | 6/2015 | Goncalves ............ H04L 51/212 709/206 |
| 2016/0035004 A1 | 2/2016 | Garcia-Martinez et al. |
| 2016/0073171 A1* | 3/2016 | Wessel ............... H04N 21/4788 725/34 |
| 2016/0080295 A1* | 3/2016 | Davies .................. H04M 3/533 709/204 |
| 2016/0098616 A1 | 4/2016 | Miller et al. |
| 2016/0099895 A1 | 4/2016 | Crawford |
| 2016/0117344 A1* | 4/2016 | Kleinpeter ........... H04L 51/043 707/748 |
| 2016/0127280 A1* | 5/2016 | Nair ...................... H04L 51/216 709/206 |
| 2016/0134583 A1* | 5/2016 | Kumar .................... H04L 51/56 709/206 |
| 2016/0191448 A1* | 6/2016 | Eck ........................ H04L 51/52 709/206 |
| 2016/0255082 A1 | 9/2016 | Rathod |
| 2016/0321263 A1* | 11/2016 | Madiraju ............ G06F 16/2457 |
| 2016/0352895 A1* | 12/2016 | Son ....................... H04L 51/063 |
| 2016/0360336 A1 | 12/2016 | Gross et al. |
| 2017/0118165 A1* | 4/2017 | Kumar ................ G06F 16/9537 |
| 2017/0346823 A1 | 11/2017 | Wadley et al. |
| 2018/0005161 A1 | 1/2018 | Cong et al. |
| 2018/0188896 A1* | 7/2018 | Ghafourifar ............ G06F 40/30 |
| 2018/0191651 A1 | 7/2018 | Goldberg et al. |
| 2018/0210874 A1* | 7/2018 | Fuxman ................. G06N 3/045 |
| 2018/0216946 A1 | 8/2018 | Gueye |
| 2018/0234795 A1 | 8/2018 | Reitz et al. |
| 2018/0246971 A1 | 8/2018 | Dejohn, III et al. |
| 2018/0267998 A1* | 9/2018 | Albouyeh ........... G06F 16/5866 |
| 2018/0316659 A1 | 11/2018 | York et al. |
| 2018/0356961 A1 | 12/2018 | Lewis et al. |
| 2019/0018581 A1* | 1/2019 | Aronoff ............... G06F 3/04883 |
| 2019/0045252 A1* | 2/2019 | Lyons ............... H04N 21/47205 |
| 2019/0147060 A1* | 5/2019 | Lau ....................... G06F 40/197 709/206 |
| 2019/0281662 A1 | 9/2019 | Reichart et al. |
| 2019/0306098 A1* | 10/2019 | Jang .................... H04L 67/1097 |
| 2020/0007502 A1* | 1/2020 | Everton ................ H04L 51/063 |
| 2020/0026347 A1* | 1/2020 | el Kaliouby ......... G06V 40/176 |
| 2020/0125218 A1* | 4/2020 | Bender .................. H04L 51/04 |
| 2020/0134101 A1 | 4/2020 | Goenka et al. |
| 2020/0153768 A1* | 5/2020 | Cohen ................. H04L 65/4015 |
| 2020/0244606 A1* | 7/2020 | Rodriguez ........ G06F 16/24578 |
| 2020/0314604 A1* | 10/2020 | Harijan .................. H04W 4/12 |
| 2020/0359166 A1 | 11/2020 | Noeth et al. |
| 2020/0359167 A1 | 11/2020 | Noeth et al. |
| 2020/0380199 A1* | 12/2020 | Judovsky ................ H04L 51/04 |
| 2020/0412864 A1* | 12/2020 | Al Majid ............. G06F 3/0488 |
| 2021/0029519 A1 | 1/2021 | Harijan et al. |
| 2021/0035436 A1* | 2/2021 | Nitsch .................. H04L 51/066 |
| 2021/0064692 A1 | 3/2021 | Srinivasan et al. |
| 2022/0179665 A1* | 6/2022 | Rathod .................. G06F 9/451 |
| 2023/0017181 A1 | 1/2023 | Srinivasan et al. |

FOREIGN PATENT DOCUMENTS

| | | |
|---|---|---|
| CN | 112166439 A | 1/2021 |
| CN | 107533564 B | 3/2021 |
| WO | 2016176375 A1 | 11/2016 |
| WO | 2018104834 A1 | 6/2018 |

* cited by examiner

SYSTEMS AND METHODS FOR GENERATING PERSONALIZED CONTENT

CROSS-REFERENCE TO RELATED APPLICATIONS

This application is a continuation of U.S. patent application Ser. No. 17/870,184 (now allowed), filed Jul. 21, 2022, which is a continuation of U.S. patent application Ser. No. 16/555,437, filed Aug. 29, 2019, now U.S. Pat. No. 11,429,778, the disclosure of which is hereby incorporated by reference herein in their entireties.

BACKGROUND

The present disclosure relates to devices generating personalized messages, and, more particularly, devices that modify a message based on relationship and context information.

SUMMARY

When sharing content or sending a message having content attached or imbedded, a recipient may be more apt to open and engage with the content if they are aware of its relevance. For example, a hyperlink or uniform resource locator (URL) and a general caption might not indicate to the recipient the relevance of the content, who or what is depicted or described in the content, or other contextual information. A recipient might ignore or otherwise skip over messages that do not readily indicate any context or relevance.

The present disclosure describes systems and methods for customizing messages, content, or both that are shared with or otherwise sent to a recipient. The system identifies a content item that is being shared with a recipient. The content item may be imbedded in or attached to a message, and may have an accompanying caption or metadata. The system analyzes the content item and any accompanying information to identify one or more entities that are depicted in, referenced, or associated with the content item. The entities can include actors, locations, events, subject matters, or any other suitable entity. Relationship information is then determined among the identified entities, the sender, and the recipient to provide some context for the content item. The system determines whether to, and how to, modify the content item, an accompanying message, or both based on the relationship information. In some embodiments, the system determines relationship information among entities and stores this information in a database to be used for further reference.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
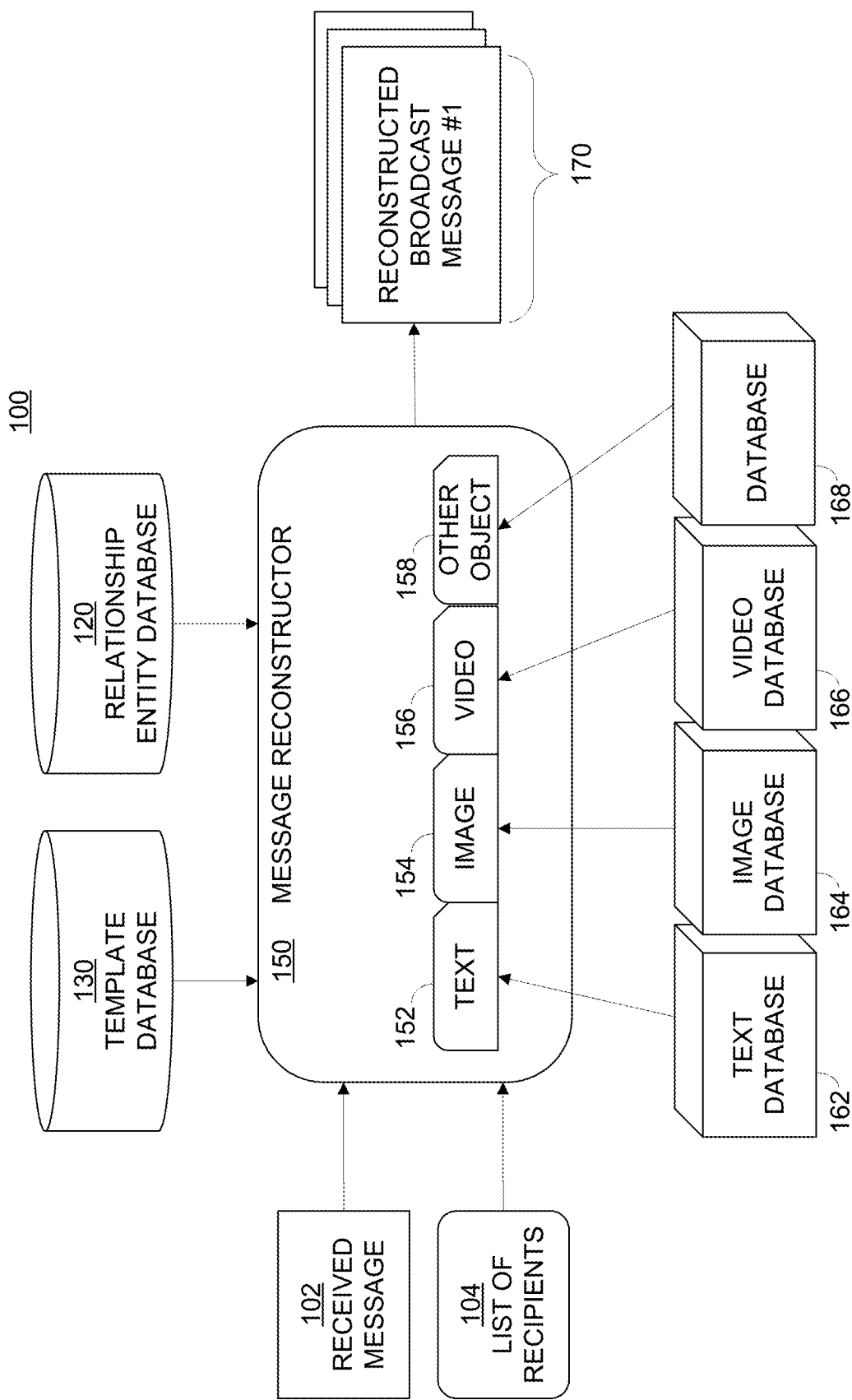
FIG. 1 is a block diagram of an illustrative system for reconstructing messages, in accordance with some embodiments of the present disclosure.

FIG. 1 is a block diagram of illustrative system 100 for reconstructing messages, in accordance with some embodiments of the present disclosure. Message reconstructor 150 receives a message (e.g., received message 102) and intended recipients (e.g., list of recipients 104), and then generates messages 170 for broadcast. Message reconstructor 150 is configured to access recipient entity database 120 to determine relationship information for each recipient of list of recipients 104. Recipients may include entities such as, for example, users, devices, accounts, instances of an application, addresses (e.g., network addresses), any other suitable entity, or any combination thereof. Message reconstructor 150 may apply one or more modifications to received message 102 to generate each of personalized messages 170. For example, message reconstructor 150 may apply text modification 152 based on text database 162. In a further example, message reconstructor 150 may apply image modification 154 based on image database 164. In a further example, message reconstructor 150 may apply video modification 156 based on video database 166. In a further example, message reconstructor 150 may apply other modification 158 based on database 168. In an illustrative example, message 102 may include a text message (e.g., entered into a smartphone), an email message (e.g., typed using a keyboard), a social media message (e.g., entered using an application on a smartphone), any other suitable message type, or any combination thereof.

Message reconstructor 150 may be used when a user wants to transmit a message to a group of people. Message reconstructor 150 includes databases that include different message formats, templates, objects, or a combination thereof. Based on the message itself, as well as the relationship between the user and each recipient, message reconstructor 150 may access the appropriate database for modifying the message. For example, message reconstructor 150 may include message reconstructing plug-ins (e.g., software modules) that are assigned a recipient name, sender name and the message to be sent. The plug-in may access the relationship entity database (e.g., managed by a relationship analyzer) to find relationship information such as broad grouping, narrow grouping, common phrases, or any other suitable information. The plug-in may then reconstruct the message by adding salutations, emojis, or other suitable modifications that result in a personalized message.

In an illustrative example, message reconstructor 150 identifies a type for each message of messages 170 to be sent and invokes an appropriate plug-in, application, module, or combination thereof. For each recipient, the plug-in identifies aspects of the messages that can be personalized. For example, the plug-in may access a predetermined plug-in dictionary for this purpose. The plug-in accesses the relationship entity database to determine personalization options for the recipient. The plug-in then generates the personalized message for transmittal. In some embodiments, message reconstructor 150 may generate each personalized message in parallel, in series, or a combination thereof. For example, an instance of the plug-in may repeat operations to generate each personalized message sequentially (e.g., in series). In a further example, multiple instances of the plug-in may operate in parallel to generate personalized messages in parallel. Referencing FIG. 1, text modification 152 may include a text plug-in configured to access database 162, image modification 154 may include an image plug-in configured to access database 164, video modification 156 may include a video plug-in configured to access database 166, and other modification 158 may include a plug-in configured to access database 168. For example, each plug-in may access a respective database, or the same database, using search keys.

In a further example, a text plug-in may be configured to categorize messages as related to well-wishes, greetings, events (e.g., festivals, holidays). In some embodiments, the text plug-in is configured to extract context using keywords (e.g., "Christmas," "Diwali," "Birthday" or any other suitable keyword). In a further example, an image plug-in may be configured to determine background and object identifiers along with text scrapers to identify a greeting type. The video plug-in may be configured to extend the image plug-in by repeating across frames of images. Once constructs of the message have been determined, the plug-in then would begin personalization by accessing the relationship entity database to determine a relationship (e.g., although this may occur in any suitable order). For example, a text plug-in may be configured to insert salutations, insert emojis, change fonts, change language, change wording, or a combination thereof. In a further example, an image plug-in may be configured to change texts in images, change background colors, change attached images, or a combination thereof. In a further example, a video plug-in may be configured to insert customized texts (e.g., an overlay) to a video message, insert a video clip in a text message, or a combination thereof.

Relationship entity database 120 includes a structured collection of information corresponding to relationships among entities. In some embodiments, relationship entity database 120 includes relationship identifiers among entities. For example, relationship identifiers may identify to which recipient category a recipient belongs relative to the sender. Entities may include, for example, users, persons, devices (e.g., user devices, network devices), locations corresponding to users, locations corresponding to devices, network entities, addresses (e.g., location-based or network-based), accounts (e.g., social media accounts, messaging services accounts), any other suitable entity that corresponds to a message sender or receiver, or any combination thereof. Relationships may include, for example, a context of interaction between entities (e.g., person to person), a category associated with a contact in a contact list, communication relationship (e.g., devices on a particular network, devices hosting a particular application), a linkage in an application (e.g., entities linked in a social network or messaging application), any other suitable relationship type, or any combination thereof. For example, a relationship identifier may include a relationship between two devices (e.g., identified by a hardware address, an IP address, device name, or other suitable identifier) that may correspond to senders and receivers of messages. For example, a device may be configured to generate messages to broadcast to recipients, without input of a message from a user. In some embodiments, message reconstructor 150 accesses relationship entity database 120, transmits entity identifiers (e.g., of a sender and recipients) to relationship entity database 120 (e.g., using a query), and retrieves a relationship identifier (e.g., identifying a recipient category such as "friend" or "coworker").

In some embodiments, message reconstructor 150 retrieves template information from template database 130. Template database 130 may include one or more templates for parsing a message into sections. For example, a template may be configured to identify a salutation, a name, a message body, a sentence, a phrase, a send-off, an attachment, metadata associated with the message, a format of the message, any other attribute of the message, or any combination thereof. In some embodiments, the message reconstructor applies a plurality of templates to determine which most closely matches the message's format. In some embodiments, message reconstructor 150 transmits the message and corresponding metadata to template database 130. In some embodiments, message reconstructor 150 retrieves a plurality of templates from template database 130 and then applies the templates to the message to determine which template applies. In some embodiments, message reconstructor 150 may determine the message format based on which template fits a matching criterion of the parts of the message. For example, a received message having a salutation, a message body, a send-off, and a signature may best match, based on the system parsing the message, an email message template having those components.

In some embodiments, template database 130 includes templates for formatting a reconstructed message. In some embodiments, a template includes instructions, criteria, or other features by which the system may determine how to format a message, determine a format of a message, or both. For example, message reconstructor 150 may receive a message and a list of recipients, each having a corresponding recipient category. For example, a recipient category "coworker" may have an associated template that includes more formal salutations, message structure, and send-off. In a further example, the template for recipient category "coworker" may apply a spelling check, a grammar check, replacement of abbreviations, replacement of phrases or words (e.g., to remove profanity, slang, or informal text), removal of images or video, any other suitable formatting appropriate for the recipient category, or any combination thereof. In a further example, the template for recipient category "friend" need not apply a spelling check or a grammar check, and may replace longhand words or phrases with abbreviations or other shorthand (e.g., determined from communications records), any other suitable formatting appropriate for the recipient category, or any combination thereof. In a further example, a template may be selected based on the message format to guide the structure of the reconstructed message.

In some embodiments, message reconstructor 150 may determine a message based on contextual information of the message. For example, message reconstructor 150 may determine a context of a received message, and then select a template that corresponds to the context. In an illustrative example, message reconstructor 150 may determine that a received message includes a dinner invitation to a plurality of guests. Message reconstructor 150 may retrieve from template database 130 a template corresponding to an event invitation, which may include text relevant to an invitation (e.g., "you are invited to:", a date, a time, a theme). In a further example, message reconstructor 150 may determine a context of a message to be holiday-related and may accordingly select a template that includes holiday-themed images or video to be included in the message. Message reconstructor 150 may use any suitable criterion to select a template from template database 130.

Figure 2:
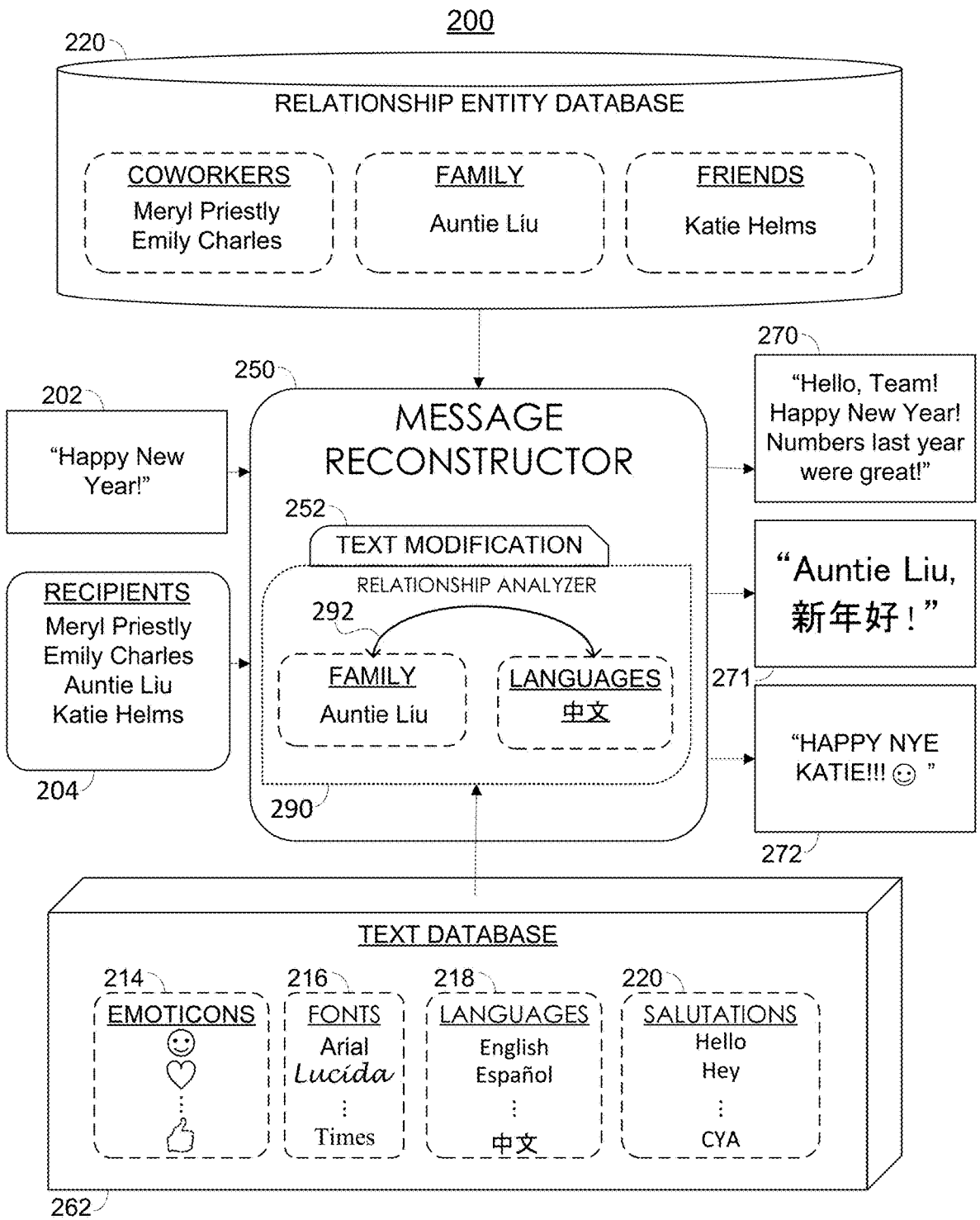
FIG. 2 is a block diagram of an illustrative system for reconstructing messages, having a particular received message, in accordance with some embodiments of the present disclosure.

FIG. 2 is a block diagram of illustrative system 200 having a received message 202, in accordance with some embodiments of the present disclosure. System 200 is similar to system 100 of FIG. 1, with only text modification 252 included for purposes of discussion. As illustrated, message reconstructor 250 receives message 202, which includes the text "Happy New Year!" For example, a user may enter "Happy New Year!" to a displayed keyboard on a touchscreen of a user device. The user also indicates the user device recipients 204, which includes four people, as illustrated. For each recipient of recipients 204, message reconstructor 250 may access relationship entity database 220 to determine relationship information. To illustrate, relationship analyzer 290 may identify each recipient and determine a relationship of the recipient. Text database 262 includes information for modifying message 202 such as, for example, emoticons 214, fonts 216, languages 218, salutations 220, or any other suitable information that may be used to modify message 202.

For recipient "Auntie Liu," relationship analyzer 290 may query relationship entity database 220 to determine a relationship of "family." Based on user preferences, relationship analyzer 290 may determine that text of received message 202 should be converted to Chinese characters for recipients that are "family." Accordingly, personalized message 271 to recipient Auntie Liu includes the original message (e.g., received message 202), but with text modification 252 including replacement of the text with Chinese characters and the salutation "Auntie Liu" inserted.

For recipient "Katie Helms," relationship analyzer 290 may query relationship entity database 220 to determine a relationship of "friend." Based on user preferences, relationship analyzer 290 may determine that text of received message 202 should be converted to informal (e.g., using an acronym or other shorthand) for recipients that are "friends." Accordingly, personalized message 272 to recipient Katie Helms includes a modification of the original message (e.g., received message 202). Text modification 252 includes replacement of the text of message 202 with "Happy NYE," the recipient first name "Katie" inserted after the text, extra exclamation points inserted, and a smiling face emoticon inserted at the end.

For recipients "Meryl Priestly" and "Emily Charles," relationship analyzer 290 may query relationship entity database 220 to determine a relationship of "coworkers." Based on user preferences, relationship analyzer 290 may determine that text of received message 202 should be appended with further text for recipients that are "coworkers." Accordingly, personalized message 270 for each of recipients Meryl Priestly and Emily Charles includes the original message (e.g., received message 202), but with text modification 252 including a salutation of "Hello, Team!" inserted at the beginning, the original message, and insertion of text "Numbers last year were great!" after the original message.

As illustrated in FIG. 2, system 200 may modify a single message of "Happy New Year!" for transmittal to different recipients having differing relationships with the sending user. In some embodiments, system 200 may include other databases for modifying a message instead of, or in addition to, text database 262. For example, system 200 may include a video database, an audio database, an image database, any other suitable database, or any combination thereof. Accordingly, a personalized message may include a video, an audio clip, an image, a link (e.g., a hyperlink), any other suitable object, or any combination thereof.

In some embodiments, relationship analyzer 290 is configured to determine the relationships among persons based on stored relationship identifiers. In some embodiments, relationship analyzer 290 is configured to classify the relationships among persons based on styles used by the individuals during their conversations.

Figure 3:
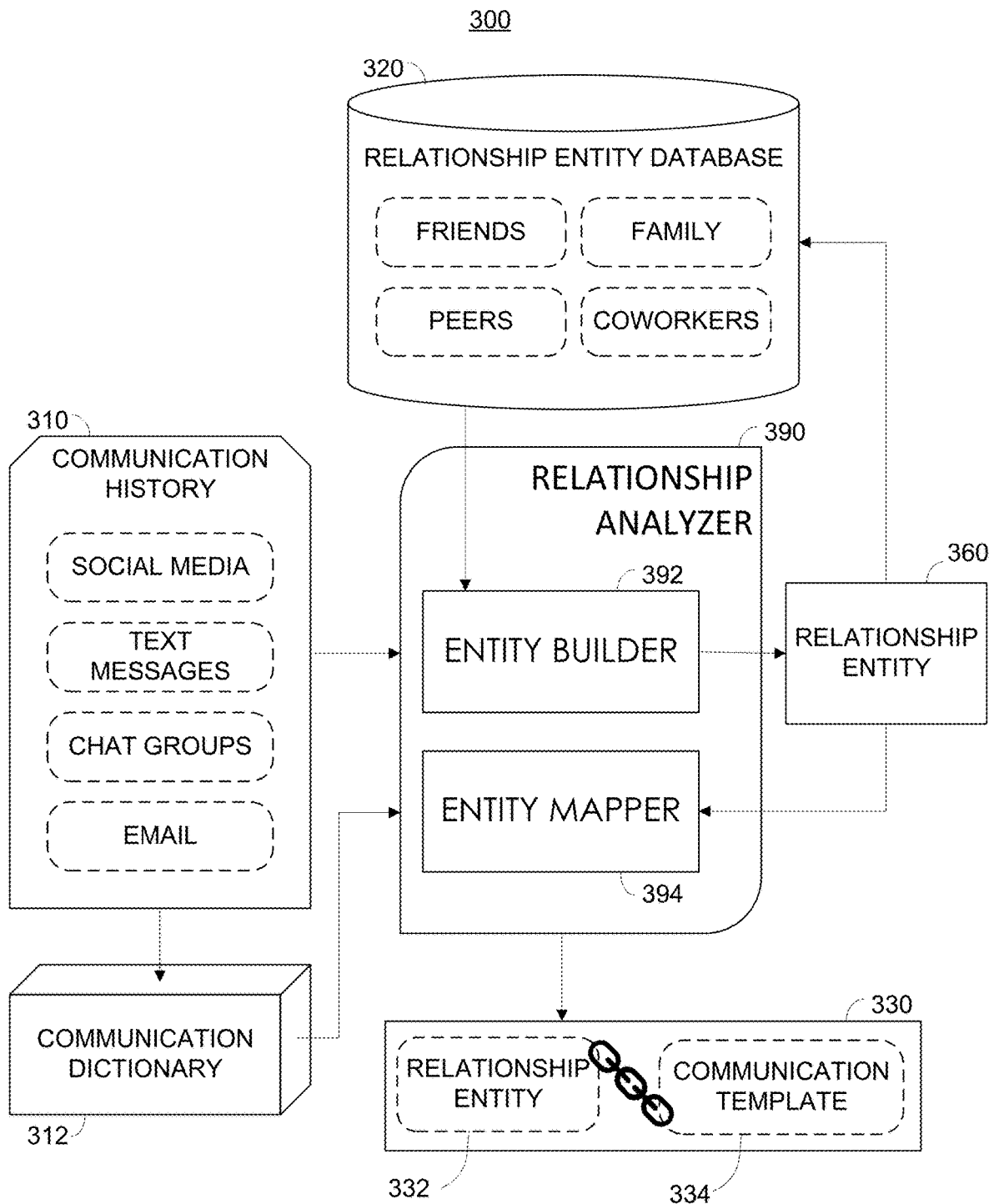
FIG. 3 is a block diagram of an illustrative system for determining recipient relationship information, in accordance with some embodiments of the present disclosure.

FIG. 3 is a block diagram of illustrative system 300 for determining recipient relationship information, in accordance with some embodiments of the present disclosure. Relationship analyzer 390 includes entity builder 392 configured to determine or confirm a recipient relationship, and entity mapper 394 configured to determine which relationship the recipient is associated with. In some embodiments, relationship analyzer 390 is included in a user's device and is configured to determine relationship information relative to that user. In some embodiments, relationship analyzer 390 is included in a network device (e.g., a server coupled to a communications network) and is configured to determine relationship information among many users based on their interactions. Relationship analyzer 390 may retrieve information from communication history 310, which contains historical communications records such as social media communications, text messages (e.g., SMS messages), chat group records, email records, any other suitable communications records, or any combination thereof. In some embodiments, communication history 310 is stored in memory of a network entity (e.g., a remote server), a cloud-based server, a central processing device, the user device, or a combination thereof. In some embodiments, communication dictionary 312 is configured to extract keywords, identify keywords, parse communications, or otherwise analyze historical communications records of communication history 310. In some embodiments, relationship analyzer 390 is configured to communicate with relationship entity database 320. In some embodiments, relationship analyzer 390 is configured to communicate with database 330 to determine one or more communication templates 334 based on a determined relationship entity 332. In some embodiments, database 330 is configured to store a plurality of communication templates 334 (e.g., message templates for formatting messages) that correspond to relationship entities 332. For example, for relationship entity "friend," database 330 may store linked communication template 334 that includes less formal salutations, emojis, abbreviations, any other message style attributes that may be inputted or extracted from historical communications records, or any combination thereof. In a further example, for relationship entity "coworker," database 330 may store linked communication template 334 that includes more formal salutations, send-offs, full names and titles, teamwork-oriented phrases, any other message style attributes that may be inputted or extracted from historical communications records, or any combination thereof. In a further example, for relationship entity "Family," database 330 may store linked communication template 334 that includes a nickname, emojis, abbreviations, text in a different language, any other message style attributes that may be inputted or extracted from historical communications records, or any combination thereof.

To illustrate, relationship analyzer 390 may be configured to curate relationships into broad and narrow groups that are used to generate messages to be sent in a broadcast/multicast scenario. For example, relationship analyzer 390 may be configured to store key phrases used in chats between individuals (e.g., "Buddy," "Howdy," or a salutation). In a further example, relationship analyzer 390 may be configured to determine Broad(Narrow) groups such as Work (colleagues, superiors, junior personnel), Friends (school, college, neighborhood, social), Relation (blood, family, romantic), Social (e.g., Facebook, WhatsApp, Snapchat, Twitter), any other suitable Broad (Narrow) grouping, or any combination thereof. In some embodiments, relationship analyzer 390 analyzes one or more interactions between individuals and may parse the interactions into units that can be analyzed (e.g., at appropriate punctuation marks, emojis, keywords, or other breakpoints). In some embodiments, relationship analyzer 390 searches for known patterns in its dictionary and builds a relationship. For example, if a profile has already been built for an interaction, relationship analyzer 390 may validate the relationship based on the information in its database.

In an illustrative example, relationship analyzer 390 may determine that user A and user B may be friends as well as colleagues based on their conversation styles. In some embodiments, both relationship entities are stored for the A-B pair in relationship entity database 320 for message reconstruction (e.g., using the appropriate relationship to build a personalized message). In some embodiments, relationship analyzer 390 identifies the presence of one or more individuals in a social group. For example, if employees of an organization are a part of a WhatsApp group, relationship analyzer 390 may associate the broad group as "Work." Further, relationship analyzer 390 may determine a narrower categorization ("Peer," "Superior, "Team member") based on a conversation style (e.g., including "Sir," "Buddy," or "Colleague") of historical conversations. Accordingly, relationship analyzer 350 stores relationship information in relationship entity database 320. For example, relationship analyzer 390 may store information such as user name, broad group identifier, narrow group identifier, commonly used objects (e.g., terms, salutations, emojis, language, wallpapers), user preferences (e.g., how to format messages to recipients of different relationship entity), any other suitable information, or any combination thereof.

In an illustrative example, Table 1 shows a record of relationship entity database 320.

TABLE 1

Illustrative record of relationship entity database.

| | |
|---|---|
| Names: | "Ram" and "Shvam" |
| Broad grouping: | "Work" |
| Narrow grouping: | "Peers" |
| Keywords: | {"Buddy"; "Bye"; "GN"; "Howdy"; ": )"} |

As illustrated in Table 1, the record includes Names (e.g., Ram and Shvam in this example), a broad grouping (e.g., Ram and Shvam are coworkers), a narrow grouping (e.g., Ram and Shvam are peers at work), and several keywords (e.g., "Buddy" as a nickname, "Bye" as a send-off, "GN" as a send-off, "Howdy" as a salutation, and an emoticon for inclusion in messages).

Figure 4:
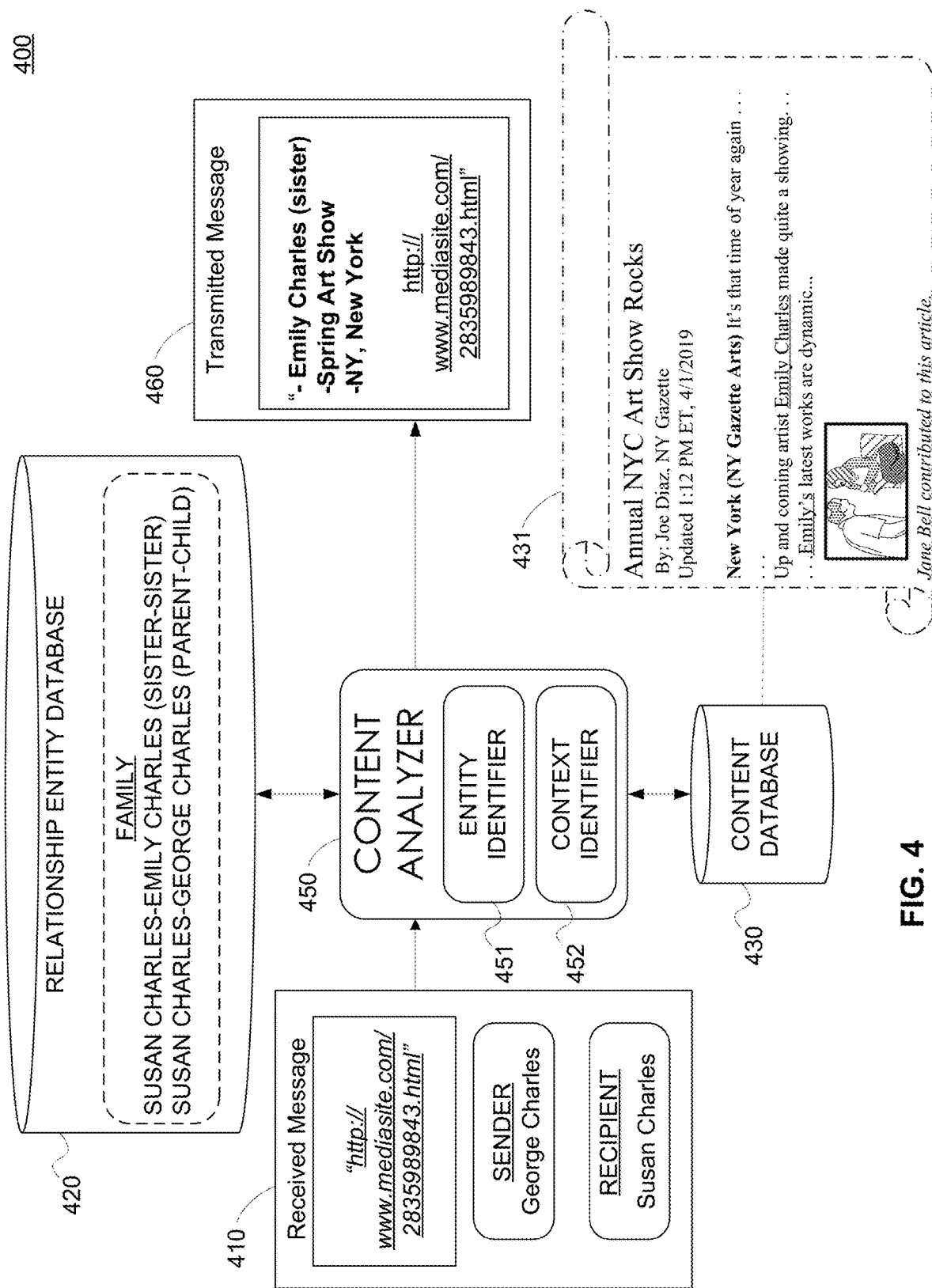
FIG. 4 is a block diagram of an illustrative system for generating a personalized message having context information, in accordance with some embodiments of the present disclosure.

FIG. 4 is a block diagram of illustrative system 400 for generating a personalized message having context information, in accordance with some embodiments of the present disclosure. Content analyzer 450 receives a message (e.g., message 410) and intended recipients (e.g., "SENDER"), and then generates message 460 for the recipient. Content analyzer 450 is configured to access relationship database 420 to determine relationship information between the sender, recipient, and any entities identified in message 410 or components thereof. Content analyzer 450 may be used when a user wants to transmit a message to a group of people (e.g., share a link with a group of people), transit a message to a single entity (e.g., a direct message, an email, or other message), post a message (e.g., on a social media feed), or otherwise share content with one or more other entities. Recipients may include entities such as, for example, users, devices, accounts, instances of an application, addresses (e.g., network addresses), any other suitable entity, or any combination thereof. Content analyzer 450 may apply one or more modifications to message 410 to generate message 460. For example, as illustrated, content analyzer 450 may add context information to message 410 to generate message 460. In a further example, content analyzer 450 may apply any suitable modification to message 410, including no modification (e.g., messages 410 and 460 may be the same), to generate message 460. In an illustrative example, message 410 may include a text message (e.g., entered into a smartphone), an email message (e.g., typed using a keyboard), a social media message (e.g., entered using an application on a smartphone), any other suitable message type, or any combination thereof. As illustrated, message 410 includes URL "http://www.mediasite.com/2835989843.html" corresponding to a web page featuring article 431. Article 431 may be hosted by, or otherwise stored in, content database 430, which may include a server or any other suitable network device or combination of devices. Message 410 has an associated sender (e.g., the entity that generates the message) and an associated recipient (e.g., the entity to whom the message is addressed).

Relationship entity database 420, which may be similar to relationship entity database 120 of FIG. 1, includes a structured collection of information corresponding to relationships among entities. In some embodiments, relationship entity database 420 includes relationship identifiers among entities. For example, relationship identifiers may identify to which recipient category a recipient belongs relative to the sender. Entities may include, for example, users, persons, devices (e.g., user devices, network devices), locations corresponding to users, locations corresponding to devices, network entities, addresses (e.g., location-based or network-based), accounts (e.g., social media accounts, messaging services accounts), any other suitable entity that corresponds to a message sender or receiver, or any combination thereof.

In some embodiments, content analyzer 450 applies a template to message 410 that may be used to modify message 410 with a salutation, a name, a message body, a sentence, a phrase, a send-off, an attachment, an image, metadata associated with the message, a format of the message, any other attribute of the message, or any combination thereof. For example, content analyzer 450 may apply one or more templates to message 410 to determine which, if any, modification may be made. Templates may be used to identify whether the message is an email (e.g., having body text, a subject, and a signature) message, a text message (e.g., including only text), a shared content item or link thereto, any other suitable message type, or any combination thereof.

In some embodiments, content analyzer 450 determines a modification based on contextual information of the message. For example, content analyzer 450, as illustrated, includes entity identifier 451, which is configured to identify entities represented in the message, associated with the content that is referenced in the message, or both. In a further example, content analyzer 450, as illustrated, includes content identifier 452, which is configured to identify content and content sources that may be associated with message 410.

Entity identifier 451 identifies entities associated with message 410, in addition to the sender and recipient of message 410. In some embodiments, entity identifier 451 analyzes text of a message to identify entities. For example, entity identifier 451 may compare text of a message to metadata tags associated with nodes of an information graph that includes information for a plurality of entities. In a further example, entity identifier 451 may compare text of a message to entities (e.g., and associated metadata) of relationship entity database 420 to identify entities. In some embodiments, content identifier 452 retrieves content, content metadata, or both, and entity identify 451 analyzes the content, metadata, or both to identify entities associated with the content. For example, entity identifier 451 may identify entities depicted in, mentioned in, or otherwise included in content. In a further example, entity identifier 451 may identify entities that correspond to metadata tags associated with the content item. In some embodiments, content analyzer 450 determines whether to generate a modified content item by retrieving relationship information from a database, determining a relationship identifier based on the relationship information, and determining whether to generate the modified content item based on the relationship identifier. For example, entity identifier 451 may generate a text query based on keywords identified in message 410 along with the sender and the recipient, and submit the query to relationship entity database 420. Relationship entity database 420 may identify entities having metadata tags that match the text query or phrases thereof. For example, relationship entity database 420 may include metadata associated with a plurality of entities, including relationship tags that identify other entities that share a relationship. To illustrate, metadata store in relationship entity database 420 for an entity "George Charles" may include the tag "relationship_father-daughter/Emily Charles_ID_24830379" indicating a familial relationship to entity "Emily Charles."

Content identifier 452 identifies content items attached to, embedded in, or otherwise associated with message 410. In some embodiments, content identifier 452 applies a template to identify content. For example, content identifier 452 may search for known text patterns such as links, URLs, hyperlinks, any other suitable text pattern, or any combination thereof. In a further example, content identifier 452 may identify attached or embedded content identifiers based on metadata, flags, or other indicators. Content analyzer 450 may access content database 430 to retrieve content items for which identifiers, links, or other linking references are identified in message 410 by content identifier 452. In some embodiments, content analyzer 450 retrieves content items from content database 430, and analyzes the content item to identify entities associated with the content.

In an illustrative example, content analyzer 450 modifies a content item based on relationship information. Content analyzer 450 receives a content item associated with a sender and a recipient, identifies at least one entity associated with the content item, and determines whether to generate a modified content item based on relationship information associated with the entity. If it is determined to generate the modified content item, content analyzer 450 determines a modification to apply to the content item to generate the modified content item. For example, the modification may include a visual indicator indicative of the at least one entity that was identified. To illustrate, the visual indicator may include text indicative of the entity, such as a name, keyword, identifier, any other suitable text, or any combination thereof. Content analyzer 450 outputs, or generates for output, the modified content item.

In some embodiments, content analyzer 450 identifies an entity associated with the content item by identifying text associated with the content item, and then analyzing the text to identify the entity. For example, the content item may include a message having text, with a link to video. Content analyzer 450 may identify keywords, generate a text query and retrieve matching entities (e.g., entities have metadata tags that match the text query) from relationship entity database 420.

In some embodiments, content analyzer 450 identifies an entity associated with the content item by identifying one or more objects associated with the content item, and then analyzing the one or more objects to identify the entity. For example, the content item may include a message having text, with a link to video. Content analyzer 450 may identify the video, retrieve the video and associated metadata from content database 430, and identify entities associated with the video based on metadata tags associated with the video, content of the video itself (e.g., using facial recognition to other adaptive technique), or both.

In some embodiments, content analyzer 450 identifies the entity associated with the content item by identifying a geographic location associated with content item, and then identifying the entity based on the geographic location. For example, the content item may include a message having text, a GPS location tag, and a link to video. Content analyzer 450 may identify the GPS location tag, generate a text query to relationship entity database 420, and identify an entity associated with the GPS location tag (e.g., an entity having an associated metadata tag that corresponds to the GPS location tag). For example, a user may share a photograph with another user, with a caption and a location marker included in metadata associated with the photograph. Content analyzer 450 may analyze the metadata to identify the location marker, and modify the caption to include text indicative of the location (e.g., a name or other identifier of the location). To illustrate, metadata associated with the photograph may include a location tag that coincides with a location tag of entity "Jim Charles," who may be George Charles' brother (e.g., relationship tag relationship_brother-brother/Jim Charles). Content analyzer 450 may modify the caption to include the text "Jim Charles (George's brother)" to indicate to the recipient a potentially relevant aspect of the photograph.

In some circumstances, content analyzer 450 may determine not to generate the modified content item, and may generate for transmission the original content item. For example, in some circumstances, entity identifier 451 might not be able to identify an entity, or identify an entity with sufficient confidence, to accurately modify the message, content, or both. In a further example, in some circumstances, content identifier 452 might not be able to identify or retrieve a content item, and accordingly is not able to analyze the content to identify one or more entities. In some embodiments, content analyzer 450 is configured to determine both whether to modify content, the message, or both, and how to modify the message, content, or both.

In some embodiments, content analyzer 450 stores the modified content item in storage. For example, the original content is generally already stored in memory storage of one or more devices. Content analyzer 450 may generate modified content and store the modified content, and any suitable metadata, in memory storage among one or more devices (e.g., user devices, network devices, any other suitable devices, or any combination thereof). In some embodiments, content analyzer 450 may store data indicative of the modifications, rather than the modified content, along with any suitable metadata. For example, content analyzer 450 may store text additions as metadata tags of the content item (e.g., tagged for the specific recipient), or as one or more separate data files.

In some embodiments, content analyzer 450 determines the modification to apply to the content item by analyzing the content item to determine context information. For example, a modification may include a visual indicator that is indicative of the context information. In some embodiments, the context information comprises one or more keywords associated with the content item. The visual indicator may include, for example, text, images, video, any other suitable content, or any combination thereof. For example, content analyzer 450 may determine that an entity associated with a content item referenced in a message is related to the message recipient as a family member. The content analyzer 450 may include a small image (e.g., a thumbnail image) of the entity in the message to indicate to the recipient that the content item is associated with that entity.

Figure 5:
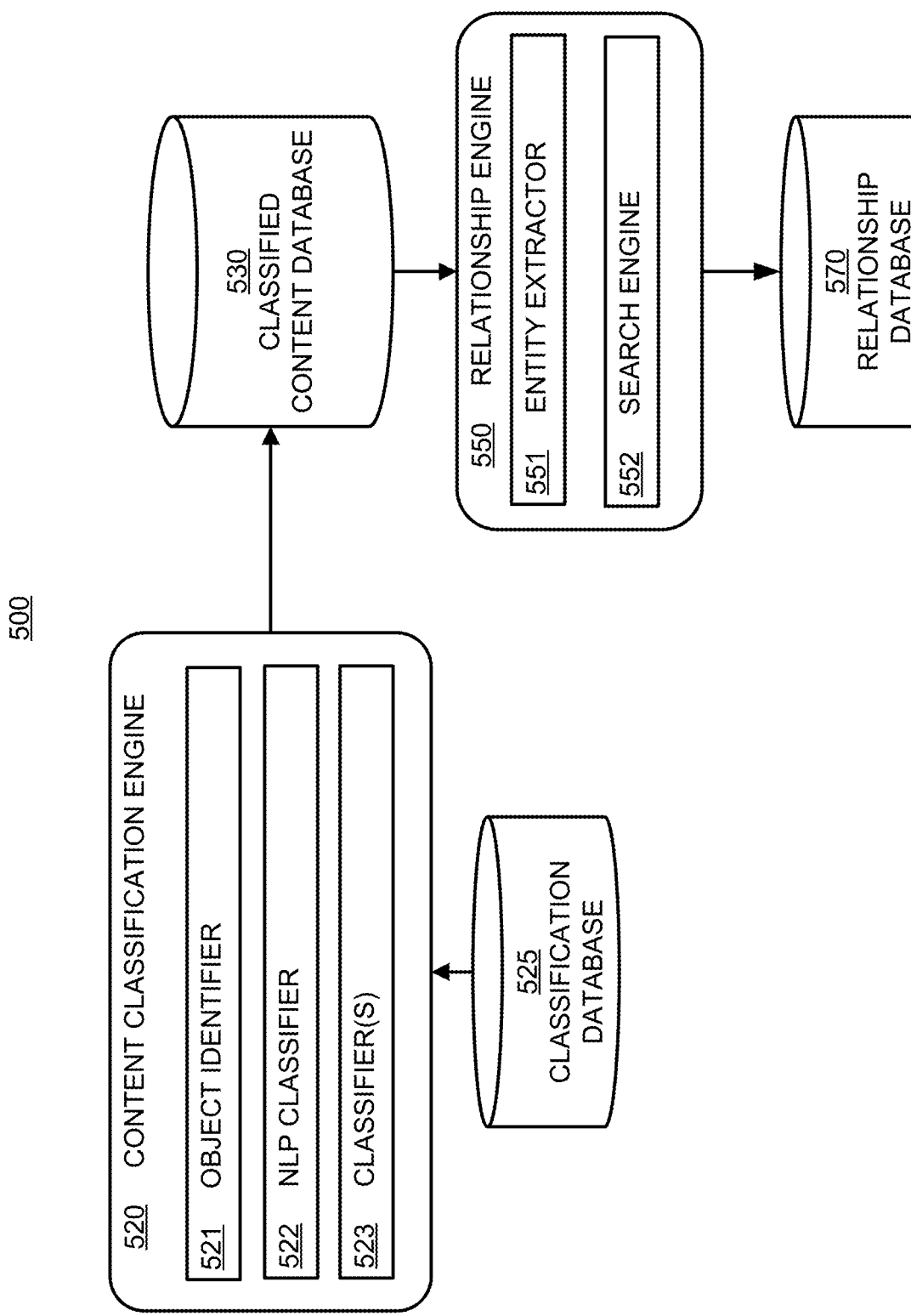
FIG. 5 is a block diagram of an illustrative system for determining relationship information based on content, in accordance with some embodiments of the present disclosure.

FIG. 5 is a block diagram of illustrative system 500 for determining relationship information based on content, in accordance with some embodiments of the present disclosure. System 500, as illustrated, includes content classification engine 520, classification database 525, classified content database 530, relationship engine 550, and relationship database 570. In some embodiments, system 500 is configured to classify content and extract relationships prior to content to being shared. For example, system 500 may classify content and extract/store relationship information as content is created or identified, but prior to an instance of sharing. In some embodiments, system 500 is configured to classify content and extract relationships as content is shared (e.g., at the time content is shared). For example, system 500 may classify content and extract/store relationship information as content is created or identified, and then modify the content or accompanying message based on the classification, relationship information, or both.

Content classification engine 520, as illustrated, includes object identifier 521, natural language processes (NLP) classifier 522, and other classifier(s) 523. System 500 may classify content that is being shared by identifying objects, text that is included in or accompanying content, or other criteria such as genre, location, popularity, any other suitable criteria, or any combination thereof. Object identifier 521 is configured to perform object recognition techniques on images and videos to identify people, places, things, events, any other suitable objects, or any combination thereof depicted in a content item. NLP classifier 522 analyzes text that is included in a content item (e.g., excerpts from an article, text in an image), text that is included in metadata associate with the content item (e.g., metadata tags or identifiers), text that accompanies the content item (e.g., a caption, note or message), any other suitable text associated with a content item, or any combination thereof. For example, in some embodiments, NLP classifier 522 generates a text based query based on text associated with the content item, and submits the query to classification database 525 to retrieve information associated with identified entities, templates, any other suitable reference information, or any combination thereof. Classifier(s) 523 may include one or more classifiers configured to analyze, In some embodiments, classifier(s) 523 may identify and analyze geographic information (e.g., a GPS tag or other location tag), genre information, storage information (e.g., in which database content is stored, which service provides/hosts the content, and formatting information), usage information (e.g., popularity, number of views, number of shares), content attributes (e.g., visual attributes, image quality, video quality, content datafile size), any other suitable information associated with the content, or any combination thereof.

In an illustrative example, each time a content item is shared, content classification engine 520 analyzes the content item. Content classification engine 520 classifies the content item based on reference information (e.g., classification constructs and any other suitable means of classifying content) stored in classification database 525. For example, reference information may include templates or other references against which content is compared. In a further example, reference information may include keywords or tags that are compared with metadata associated with the content item. In an illustrative example, content classification engine 520 may identify a video clip of an art gala, and metadata associated with the video may include one or more tags identifying entities (e.g., artists, art collectors, or art critics in this example, along with a location of an art museum) shown or mentioned in the video. Content classification engine 520 may then compare those tags with a plurality of templates that include respective keywords. A template that includes one or more keywords such as artists' name, the art museum name, art-based keywords, or other similar tags may be selected as the most representative template. Content classification engine 520 may determine a classification of "art event" based on the selected template. In some embodiments, classification database 525 includes an information graph or knowledge graph, storing information about entities, subject-matters, actor-groups (e.g., class of Vth grade), location, attributes, any other suitable information, or any combination thereof.

In some embodiments, the results of the classification of content classification engine 520 are stored in classified content database 530. Classified content database 530 may be implemented on any suitable hardware, which may be the same as or different from hardware or devices in which content classification engine 520 is implemented. Classified content database 530 may be configured to store information in any suitable format, arranged in any suitable arrangement, in accordance with the present disclosure. In some embodiments, classified content database 530 and classification database 525 may be stored as a single database, or implemented on one or more devices. In some embodiments, classified content database 530 is separate from classification database 525, stored on the same hardware or different hardware. In some embodiments, classified content database 530 includes an information graph, which includes information about a plurality of entities related to each other. Content items that have undergone analysis by content classification engine 520 may be stored in classified content database 530.

Relationship engine 550 identifies content items from classified content database 530, and determines relationship information for those content items. Relationship engine 550, as illustrated, includes entity extractor 551 and search engine 552.

Entity extractor 551 is configured to extract actors associated with (e.g., represented in) content that is stored in classified content database 530. In some circumstances, all actors might not have access to social media channels and may possibly have proxies who would share their content (e.g., parents of children). In an illustrative example, relationship engine 550 is configured to identify relationships where the existence of accounts in social media may be absent for the actors associated with the content. In a further illustrative example, relationship engine 550 need not analyze content associated with actors that have active social media handles (e.g., a forum of known relationships stored in data). In some embodiments, relationship engine 550 is configured to search among other content such as, for example, photos and videos featuring the actor, and recognize objects that are depicted to be accompanying them. In some embodiments, relationship engine 550 accesses one or more databases such as, for example, community-focused databases (not shown) to establish first level relationships among entities.

Classified content items that have undergone analysis by relationship engine 550 may be stored in relationship database 570. Relationship database 570 may be implemented on any suitable hardware, which may be the same as or different from hardware or devices in which classification database 525, classified content database 530, or both are implemented. Relationship database 570 may be configured to store information in any suitable format, arranged in any suitable arrangement, in accordance with the present disclosure. In some embodiments, relationship database 570, classified content database 530, and classification database 525 may be stored as a single database, or implemented on one or more devices. In some embodiments, relationship database 570 is separate from classification database 525, classified content database, or both, and may be stored on the same hardware or different hardware as these other databases. In some embodiments, relationship database 570 includes an information graph, which includes information about a plurality of entities related to each other, and context indicative of those relationships.

In an illustrative example, relationship entity database 420 of FIG. 4 may similar to relationship database 570 of FIG. 5. In some embodiments, the output of relationship engine 550 is stored in relationship database 570, and this information may be searched by content analyzer 450 of FIG. 4 to retrieve relationship information. In some embodiments, system 400 may receive message 410, analyze the message to extract entities associated with the message (e.g., sender, recipient, entity represented in the content). Content analyzer 450 may generate a text query based on the extracted entities, and submit the query to relationship entity database 420, which may be populated by system 500 of FIG. 5. In some embodiments, system 400 of FIG. 4 and system 500 of FIG. 5 may be included in a single system, implemented on a single device, or a combination of devices.

Figure 6:
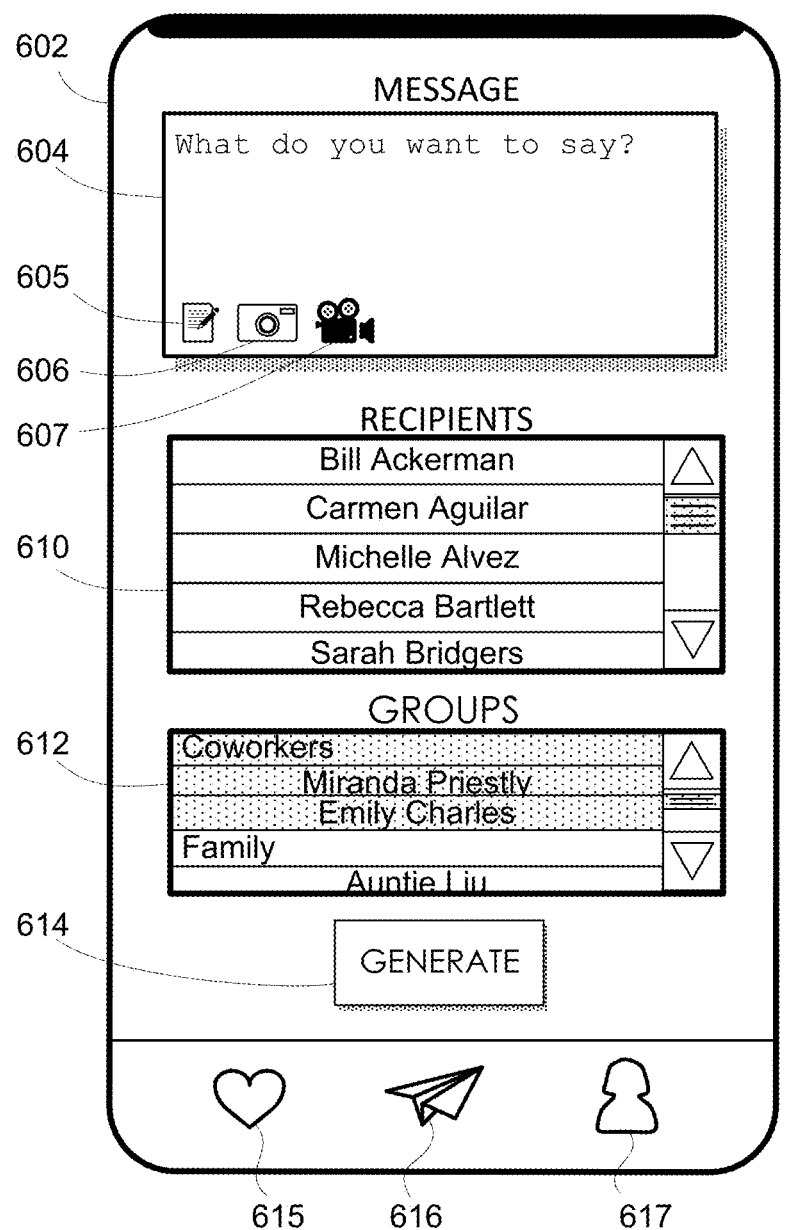
FIG. 6 shows a face view of an illustrative device display for inputting a desired message to be sent, in accordance with some embodiments of the present disclosure.

FIG. 6 shows a face view of illustrative device display 602 for inputting a desired message to be sent, in accordance with some embodiments of the present disclosure. Device 600 may include a smartphone or other suitable user device configured to receive a message inputted by a user. As illustrated, device display 602 shows a text entry region 604 with icons 605-607, list of potential recipients 610, list of broad groupings 612, soft button 614 configured to receive a user indication to generate personalized messages, and icons 615-617 for indicating user instructions in navigating the displayed software application.

Text entry region 604 may include a displayed cursor and may display text inputted by a user. For example, the user may provide haptic interaction to the screen of device 600 by touching displayed keys of a displayed keyboard. In a further example, a user may enter a message to text entry region 604. Icon 605 corresponds to inserting text into text entry region 604. For example, when a user selects icon 605 (e.g., pressing the region of the screen corresponding to icon 605), a touchscreen keyboard may be displayed. Icon 606 corresponds to inserting an image into text entry region 604. For example, when a user selects icon 606 (e.g., pressing the region of the screen corresponding to icon 606), a file folder, directory, camera application, or thumbnail gallery of stored images may be displayed. Icon 607 corresponds to inserting video into text entry region 604. For example, when a user selects icon 607 (e.g., pressing the region of the screen corresponding to icon 607), a file folder, directory, a camera application, or thumbnail gallery of stored videos may be displayed.

List of potential recipients 610, as illustrated, includes a list of recipients to whom messages may be sent. For example, list of potential recipients 610 may include a contacts list stored in memory of device 600. In a further example, list of potential recipients 610 may include recipients with whom the user has communicated using device 600, an application of device 600, a list of social media network entities connected to the user, or any combination thereof. List of potential recipients 610, as illustrated, includes a vertical list with a scroll bar for navigating the list.

List of broad groupings 612 includes a list of broad group identifiers such as "Coworkers" and "Family" as illustrated. In some embodiments, recipients of list of potential recipients 610 may be grouped into broad groupings in list of broad groupings 612. List of broad groupings 612, as illustrated, includes a vertical list with a scroll bar for navigating the list, with a listing of corresponding recipients provided for each broad grouping.

Soft button 614 may be selected by a user (e.g., by pressing the region of the screen corresponding to soft button 614) to generate a plurality of personalized messages. Icons 615, 616, and 617 may be used to navigate the software messaging application displayed. For example, as illustrated, icon 416 indicates a "send message" screen (e.g., currently displayed), on which the user may compose a message, select recipients, and send personalized messages.

In an illustrative example, a user may input a message to text entry region 604, select a plurality of recipients from either list of potential recipients 610 or list of broad groupings 612, and generate a plurality of messages by selecting soft button 614.

Figure 7:
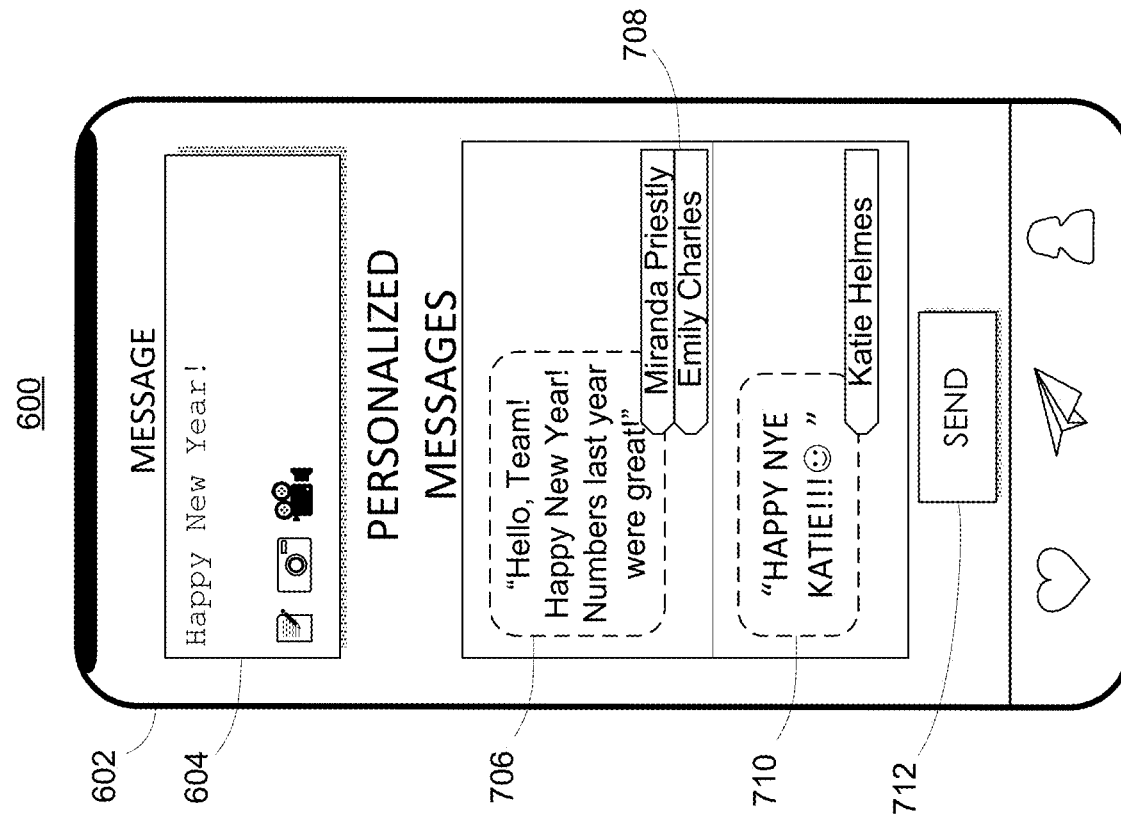
FIG. 7 shows a face view of the illustrative device display of FIG. 6, with a received message and personalized messages, in accordance with some embodiments of the present disclosure.

FIG. 7 shows a face view of illustrative device display 602 of FIG. 6, with a received message and personalized messages, in accordance with some embodiments of the present disclosure. The user has entered the message "Happy New Year!" into text entry region 404 and generated personalized messages 706 and 710. As illustrated, the user has selected three recipients, two of whom are "Coworkers" (e.g., see list of broad groupings 612 of FIG. 6), and one of whom is a "Friend" (e.g., Katie Helms). Personalized message 706 for the coworkers is tailored for work, including text that has relevance for the workplace, and a format that is mostly formal. Personalized message 710 for the friend is less formal than personalized message 706, including a recipient name, an abbreviation, an emoticon, and several exclamation points to indicate excitement. Accordingly, the original message "Happy New Year!" is used to generate personalized messages 706 and 710 having differing formats, language, and tones.

Figure 8:
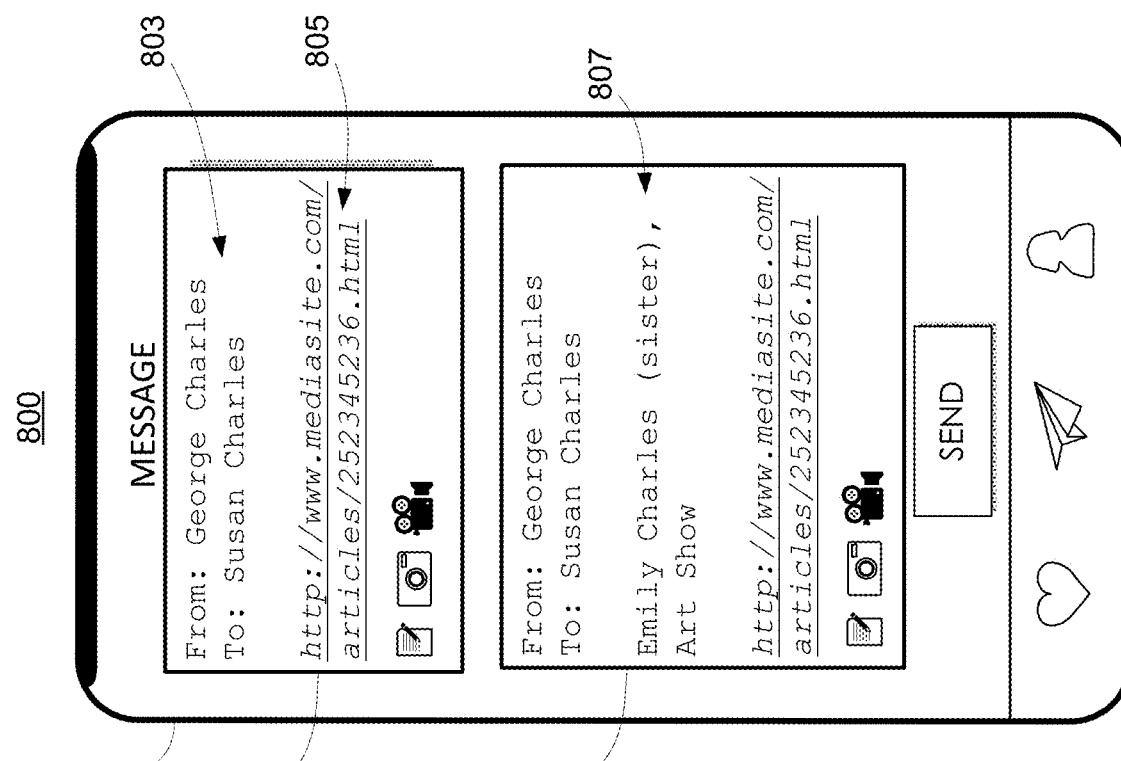
FIG. 8 shows a face view of an illustrative device display, having context information displayed, in accordance with some embodiments of the present disclosure.

FIG. 8 shows a face view of illustrative device display 802, having context information displayed, in accordance with some embodiments of the present disclosure. Device 800 may include a smartphone or other suitable user device configured to receive a message inputted by a user. As illustrated, device display 802 shows first region 804, which is displaying a first message (e.g., a link to a content item, as illustrated), and second region 806, which is displaying a second message (e.g., the link to the content item, as well as context information, as illustrated). In some embodiments, for example, device 800 is similar to device 600 of FIGS. 6-7. Further, first region 804 may be similar to text entry region 604 of FIGS. 6-7.

In some embodiments, first region 804 may include a text entry region, into which the user may type or otherwise generate messages. The messages may include a link (e.g., the user may share link 805 to a content item), text, images, graphics, video, or any other components. For example, the user may provide haptic interaction to the screen of device 800 by touching displayed keys of a displayed keyboard. In a further example, a user may enter a message to first region 804.

Sender-receiver 803, as illustrated, includes a sender identifier (e.g., a name, an email address, a username, a handle, or any other identifier) and a recipient (e.g., a name, an email address, a username, a handle, or any other identifier) to whom the message may be sent. For example, list of potential recipients may include a contacts list stored in memory of device 800.

Link 805, as illustrated, includes a URL to an article posted on a website (e.g., that the sender wishes to share with the recipient). For example, link 805 may include text, a hyperlink, an IP address, a website, or any other information that may be used to direct a user to the corresponding content. In the illustrative example of FIG. 8, link 805 corresponds to an article about an Art Show, in which Emily Charles' artwork is featured (e.g., a similar example is described in the context of FIG. 4). In this example, Emily Charles is the sister of Susan Charles, and the daughter of George Charles.

In some embodiments, second region 806 may include a text entry region, into which the user may type or otherwise generate messages. The messages may include a link (e.g., the user may share link 805 to a content item), text, images, graphics, video, or any other components. For example, the user may provide haptic interaction to the screen of device 800 by touching displayed keys of a displayed keyboard. In a further example, a user may enter a message, or components thereof (e.g., text, images, video), to second region 806. As illustrated, device 800 identifies the sender-recipient (e.g., sender-recipient 803), the original message (e.g., link 805), and context information 807. In some embodiments, device 800, which may execute a messaging application, analyzes the original message to determine context information 807, and then generates a modification to the message to provide a more descriptive message to the recipient. For example, as illustrated, device 800 adds the text "Emily Charles (sister)" and "Art Show" into the message body to indicate to the recipient the relevance of the original message.

In an illustrative example, sender George Charles may use device 800 to copy and paste link 805 into first region 805 to send link 805 to his daughter Susan Charles. In some embodiments, modifications are made to a message at the senders device. For example, the modification (e.g., an addition of context information) may be made by the sending user's device at the time of message creation or shortly after, and prior to sending.

In an illustrative example, recipient "Susan Charles" may use device 800 to receive messages. As sender may copy and paste link 805 into a text region and send the message. In some embodiments, modifications are made to a message at the recipient device. For example, the modification (e.g., an addition of context information) may be made by the recipients user's device at the time of message receipt or shortly after, or when the message is opened.

In an illustrative example, a sender may send a message to a recipient, using a first user device to generate and send the message. The message may be transmitted to a message application server, which then redirects the message. The recipient may use a second user device to receive and open the message. In some embodiments, the message application server generates the modification to the message, prior to transmitting the message to the recipient's user device.

Figure 9:
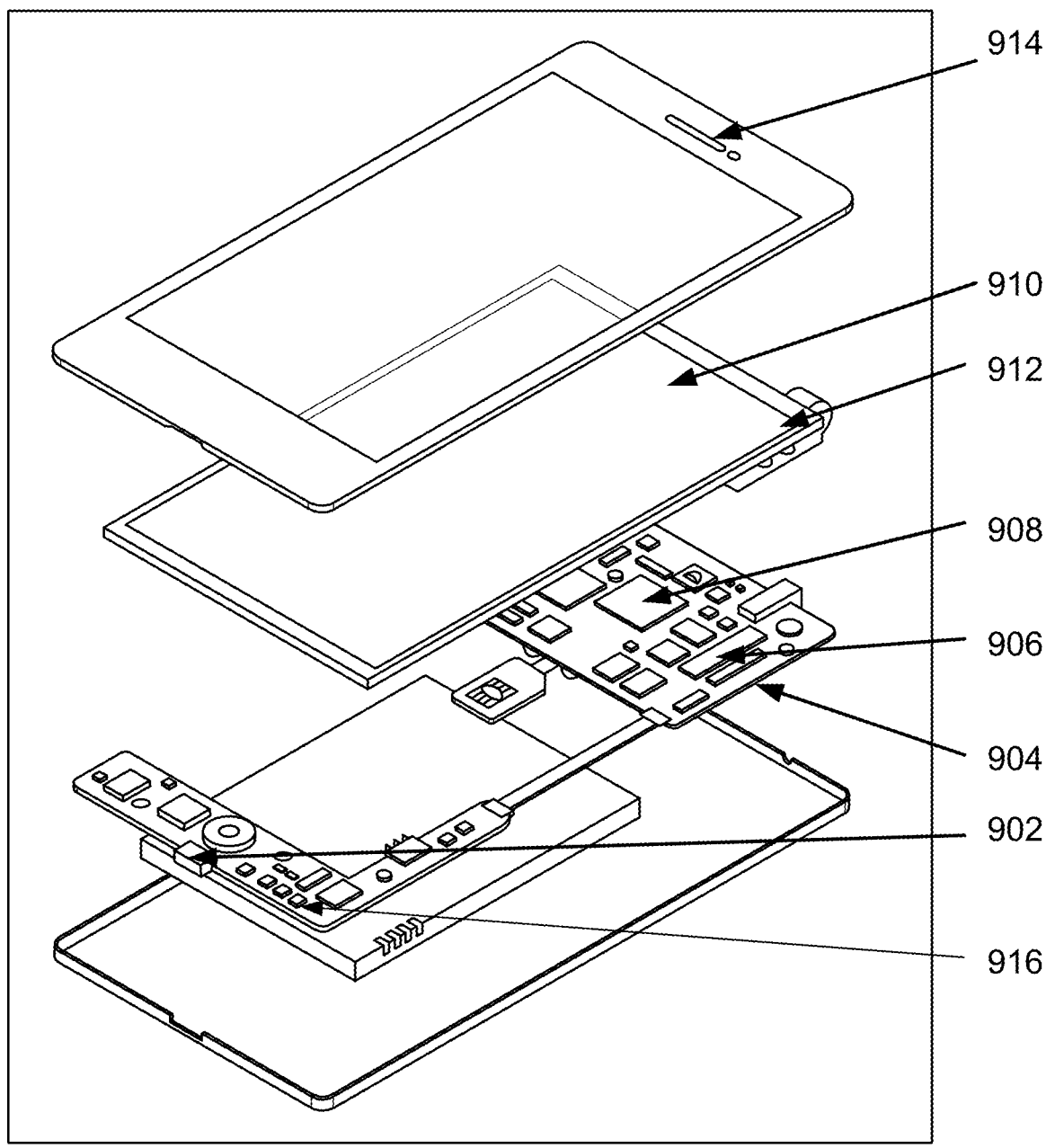
FIG. 9 is a block diagram of an illustrative user device, in accordance with some embodiments of the present disclosure.

A user may access content, an application, and other features from one or more of their devices (i.e., user equipment). FIG. 9 shows generalized embodiments of an illustrative user device. Although illustrated as a mobile user device (e.g., a smartphone), user device 900 may include any user electronic device with which a user may send and receive messages with other users. For example, user device 900 may include a desktop computer, a tablet, a laptop, a remote server, any other suitable device, or any combination thereof. In some embodiments, display 912 may include a touchscreen, a television display or a computer display. In some embodiments, the one or more circuit boards illustrated include processing circuitry, control circuitry, and storage (e.g., RAM, ROM, Hard Disk, Removable Disk, etc.). In some embodiments, circuit boards include an input/output path. User device 900 may receive content and data via input/output (hereinafter "I/O") path 902. I/O path 902 may provide content and data to control circuitry 904, which includes processing circuitry 906 and storage 908. Control circuitry 904 may be used to send and receive commands, requests, and other suitable data using I/O path 902. I/O path 902 may connect control circuitry 904 (and specifically processing circuitry 906) to one or more communications paths (described below). I/O functions may be provided by one or more of these communications paths but are shown as a single path in FIG. 9 to avoid overcomplicating the drawing.

Control circuitry 904 may be based on any suitable processing circuitry such as processing circuitry 906. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry is distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 904 executes instructions for an application stored in memory (e.g., storage 908). Specifically, control circuitry 904 may be instructed by the application to perform the functions discussed above and below. For example, the application may provide instructions to control circuitry 904 to generate media guidance displays. In some implementations, any action performed by control circuitry 904 may be based on instructions received from the application.

In some client-server-based embodiments, control circuitry 904 includes communications circuitry suitable for communicating with an application server or other networks or servers. The instructions for carrying out the above-mentioned functionality may be stored on the application server. Communications circuitry may include a cable modem, an integrated-services digital network (ISDN) modem, a digital subscriber line (DSL) modem, a telephone modem, an ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as storage 908 that is part of control circuitry 904. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, or any other suitable fixed or removable storage devices, and/or any combination of the same. Storage 908 may be used to store various types of content described herein as well as media guidance data described above. Nonvolatile memory may also be used (e.g., to launch a boot-up routine and other instructions). Cloud-based storage, for example, may be used to supplement storage 908 or instead of storage 908.

A user may send instructions to control circuitry 904 using user input interface 910. User input interface 910, display 912, or both, may include a touchscreen configured to provide a display and receive haptic input. For example, the touchscreen may be configured to receive haptic input from a finger, a stylus, or both. In some embodiments, equipment device 900 may include a front-facing screen and a rear-facing screen, multiple front screens, or multiple angled screens. In some embodiments, user input interface 910 includes a remote-control device having one or more microphones, buttons, keypads, any other components configured to receive user input or combinations thereof. For example, user input interface 910 may include a handheld remote-control device having an alphanumeric keypad and option buttons.

Audio equipment 914 may be provided as integrated with other elements of user device 900 or may be stand-alone units. The audio component of videos and other content displayed on display 912 may be played through speakers of audio equipment 914. In some embodiments, the audio may be distributed to a receiver (not shown), which processes and outputs the audio via speakers of audio equipment 914. In some embodiments, for example, control circuitry 904 is configured to provide audio cues to a user, or other audio feedback to a user, using speakers of audio equipment 914. Audio equipment 914 may include a microphone configured to receive audio input such as voice commands or speech. For example, a user may speak letters or words that are received by the microphone and converted to text by control circuitry 904. In a further example, a user may voice commands that are received by the microphone and recognized by control circuitry 904.

An application (e.g., for generating a display) may be implemented using any suitable architecture. For example, a stand-alone application may be wholly implemented on user device 900. In some such embodiments, instructions for the application are stored locally (e.g., in storage 908), and data for use by the application is downloaded on a periodic basis (e.g., from an out-of-band feed, from an Internet resource, or using another suitable approach). Control circuitry 904 may retrieve instructions of the application from storage 908 and process the instructions to generate any of the displays discussed herein. Based on the processed instructions, control circuitry 904 may determine what action to perform when input is received from input interface 910. For example, movement of a cursor on a display up/down may be indicated by the processed instructions when input interface 910 indicates that an up/down button was selected. An application and/or any instructions for performing any of the embodiments discussed herein may be encoded on computer readable media. Computer-readable media includes any media capable of storing data. The computer-readable media may be transitory, including, but not limited to, propagating electrical or electromagnetic signals, or it may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

In some embodiments, the application is a client-server-based application. Data for use by a thick or thin client implemented on user device 900 is retrieved on demand by issuing requests to a server remote from user device 900. For example, the remote server may store the instructions for the application in a storage device. The remote server may process the stored instructions using circuitry (e.g., control circuitry 904) and generate the displays discussed above and below. The client device may receive the displays generated by the remote server and may display the content of the displays locally on user device 900. This way, the processing of the instructions is performed remotely by the server while the resulting displays (e.g., that may include text, a keyboard, or other visuals) are provided locally on user device 900. User device 900 may receive inputs from the user via input interface 910 and transmit those inputs to the remote server for processing and generating the corresponding displays. For example, user device 900 may transmit a communication to the remote server indicating that an up/down button was selected via input interface 910. The remote server may process instructions in accordance with that input and generate a display of the application corresponding to the input (e.g., a display that moves a cursor up/down). The generated display is then transmitted to user device 900 for presentation to the user.

In some embodiments, the application is downloaded and interpreted or otherwise run by an interpreter or virtual machine (e.g., run by control circuitry 904). In some embodiments, the application may be encoded in the ETV Binary Interchange Format (EBIF), received by control circuitry 904 as part of a suitable feed, and interpreted by a user agent running on control circuitry 904. For example, the application may be an EBIF application. In some embodiments, the application may be defined by a series of JAVA-based files that are received and run by a local virtual machine or other suitable middleware executed by control circuitry 904.

Figure 10:
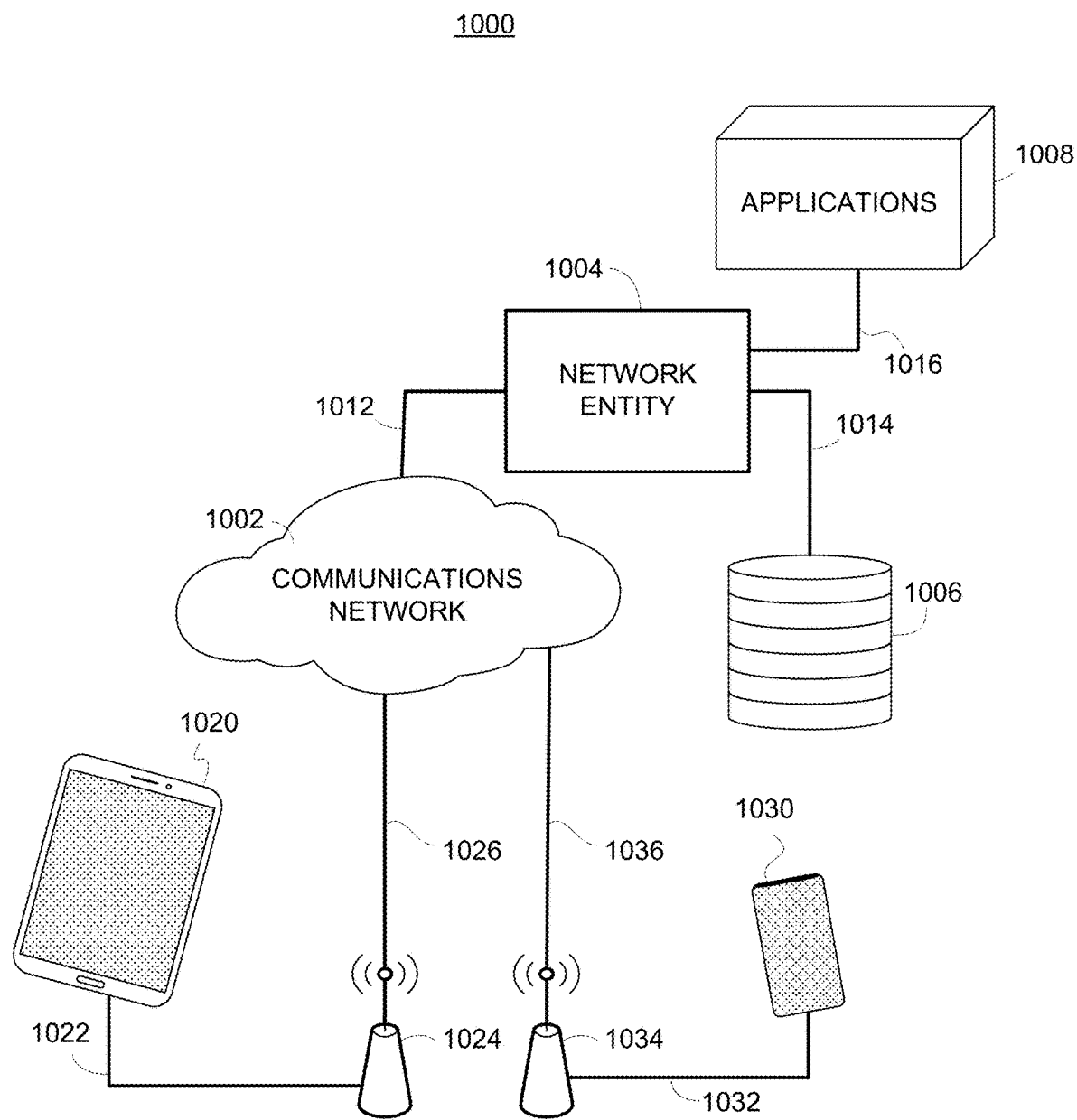
FIG. 10 is a block diagram of an illustrative system for transmitting messages, in accordance with some embodiments of the present disclosure.

FIG. 10 is a block diagram of illustrative system 1000 for transmitting messages, in accordance with some embodiments of the present disclosure. In system 1000, there may be more than one of each type of user device, but only one of each is shown in FIG. 10 to avoid overcomplicating the drawing. In addition, each user may utilize more than one type of user device and also more than one of each type of user device. In some embodiments, a user device (e.g., user device 1030, user computer equipment 1020) may be referred to as a "second screen device." For example, a second screen device may supplement content, software applications, or other functionality presented on a first user device. As illustrated, a first user may use user device 1020 and a second user may use user device 1030 (e.g., a sender and a recipient of a message).

User devices 1020 and 1030, illustrated as wireless-enabled devices, may be coupled to communications network 1002 (e.g., the Internet). For example, user device 1020 is coupled to communications network 1002 via communications path 1022 to access point 1024 and wired connection 1026, and user device 1030 is coupled to communications network 1002 via communications path 1032 to access point 1034 and wired connection 1036. User devices 1020 and 1030 may also include wired connections to a LAN, or any other suitable communications link to network 1002. Communications network 1002 may be one or more networks including the Internet, a mobile phone network, mobile voice or data network (e.g., a 4G or LTE network), cable network, public switched telephone network, or other types of communications network or combinations of communications networks. Paths 1012, 1026, and 1036 may separately or together include one or more communications paths, such as a satellite path, a fiber-optic path, a cable path, a path that supports Internet communications, free-space connections (e.g., for broadcast or other wireless signals), or any other suitable wired or wireless communications path or combination of such paths. Although communications paths are not drawn between user devices 1020 and 1030, these devices may communicate directly with each other via communications paths, such as those described above in connection with paths 1026 and 1036, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 1002.

System 1000 includes network entity 1004 (e.g., a server or other suitable computing device) coupled to communications network 1002 via communications path 1012. Path 1012 may include any communications path described above in connection with paths 1026 and 1036. Communications with network entity 1004 may be exchanged over one or more communications paths but are shown as a single path in FIG. 10 to avoid overcomplicating the drawing. Network entity is configured to access database 1006 or applications 1008 (e.g., an applications database or host server) via communications links 1014 and 1016, respectively. Although shown as separate device, network entity 1004 may include database 1006 and applications 1008 (e.g., stored in memory). In addition, there may be more than one of each of database 1006 and applications 1008, but only one of each is shown in FIG. 10 to avoid overcomplicating the drawing. In some embodiments, database 1006 and applications 1008 may be integrated as one source device (e.g., that me be, but need not be, network entity 1004). Although communications between database 1006 and applications 1008 with user devices 1020 and 1030 are shown as through communications network 1002, in some embodiments, database 1006 and applications 1008 may communicate directly with user devices 1020 and 1030 via communications paths (not shown) such as those described above.

Database 1006 may include one or more types of stored information, including, for example, relationship information, a relationship entity database, recipient information, historical communications records, user preferences, user profile information, a template database, any other suitable information, or any combination thereof. Applications 708 may include an applications-hosting database or server, plug-ins, a software developers kit (SDK), an applications programming interface (API), or other software tools configured to provide software (e.g., as download to a user device), run software remotely (e.g., hosting applications accessed by user devices), or otherwise provide applications support to applications of user devices 1020 and 1030. In some embodiments, information from network entity 1004, database 1006, applications 1008, or a combination thereof may be provided to a user device using a client-server approach. For example, user device 1020 or user device 1030 may pull information from a server, or a server may push information to user device 1020 or user device 1030. In some embodiments, an application client residing on user device 1020 or user device 1030 may initiate sessions with database 1006, applications 1008, network entity 1004, or a combination thereof to obtain information when needed (e.g., when data is out-of-date or when a user device receives a request from the user to receive data). In some embodiments, information may include user information. For example, the user information may include current and/or historical user activity information (e.g., what communications the user engages in, what times of day the user sends/receives messages, whether the user interacts with a social network, at what times the user interacts with a social network to post information, what types of content the user typically inserts in messages, stored contacts of the user, frequent contacts of the user, any other suitable information, or any combination thereof. In some embodiments, the user information may identify patterns of a given user for a period of more than one year.

In some embodiments, an application may include a message reconstructor as a stand-alone application implemented on user devices 1020 and 1030. For example, the application may be implemented as software or a set of executable instructions which may be stored in storage (e.g., storage 908) of the user devices (e.g., user device 900), and executed by control circuitry (e.g., control circuitry 904) of the user devices (e.g., user device 900). In some embodiments, an application may include a message reconstructor application that is implemented as a client-server-based application where only a client application resides on the user device, and a server application resides on a remote server (e.g., network entity 1004). For example, message reconstructor applications may be implemented partially as a client application on user device 1020 or user device 1030 (e.g., by control circuitry 904 of user equipment device 900) and partially on a remote server as a server application running on control circuitry of the remote server (e.g., control circuitry of network entity 1004). When executed by control circuitry of the remote server, the message reconstructor application may instruct the control circuitry to generate the displays and transmit the generated displays to user devices 1020 and 1030. The server application may instruct the control circuitry of the remote device to transmit data for storage on user device 1020 or user device 1030. The client application may instruct control circuitry of the receiving user device to generate the application displays.

In some embodiments, the arrangement of system 1000 is a cloud-based arrangement. The cloud provides access to services, such as information storage, messaging, or social networking services, among other examples, as well as access to any content described above, for user devices. Services can be provided in the cloud through cloud computing service providers, or through other providers of online services. For example, the cloud-based services can include a storage service, a sharing site, a social networking site, or other services via which user-sourced content is distributed for viewing by others on connected devices. These cloud-based services may allow a user device to store information to the cloud and to receive information from the cloud rather than storing information locally and accessing locally stored information. Cloud resources may be accessed by a user device using, for example, a web browser, a messaging application, a desktop application, a mobile application, and/or any combination of access applications of the same. The user device may be a cloud client that relies on cloud computing for application delivery, or the user equipment device may have some functionality without access to cloud resources. For example, some applications running on the user device may be cloud applications (e.g., applications delivered as a service over the Internet), while other applications may be stored and run on the user device. In some embodiments, a user device may receive information from multiple cloud resources simultaneously.

Figure 11:
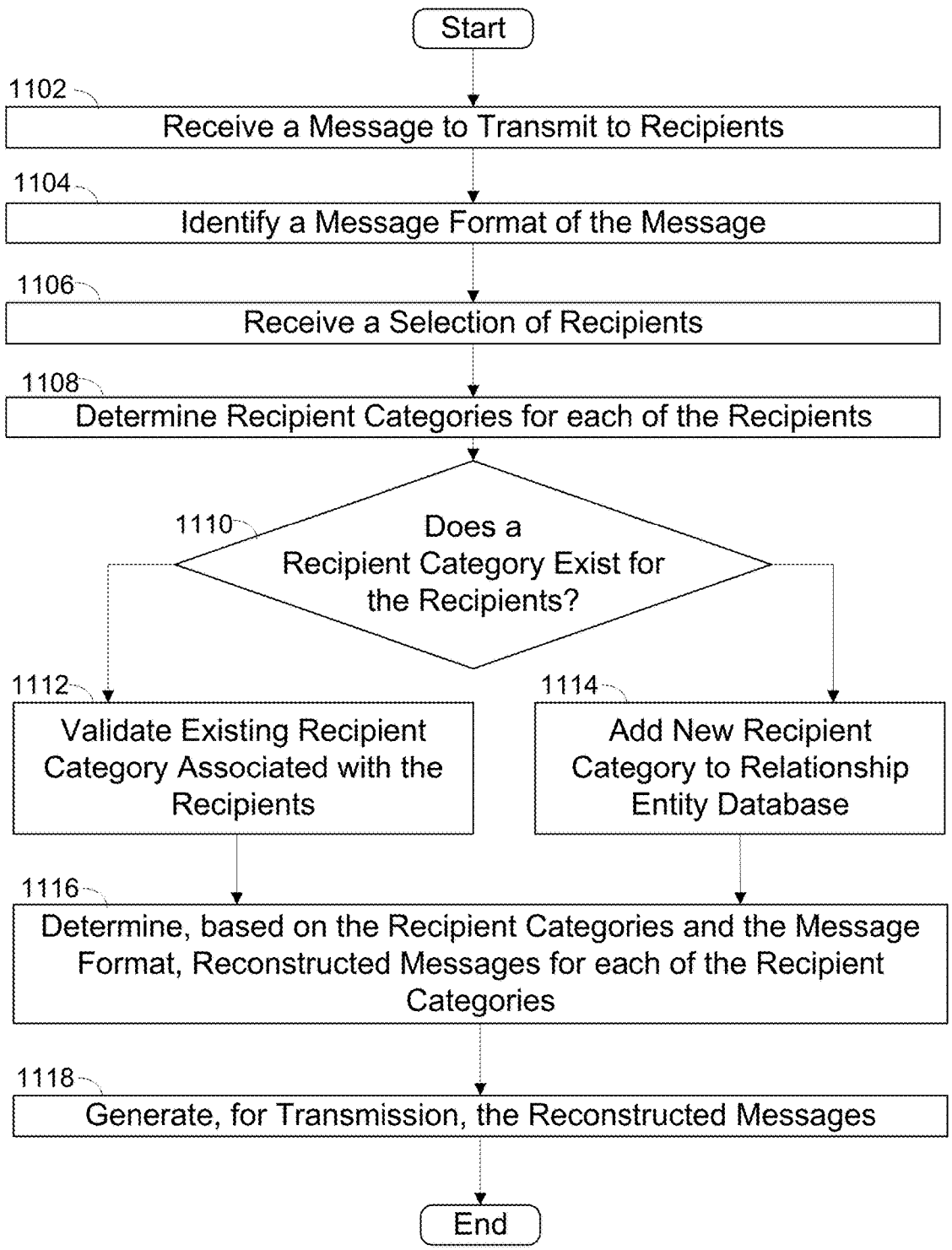
FIG. 11 shows a flowchart of an illustrative process for generating personalized messages, in accordance with some embodiments of the present disclosure.

FIG. 11 shows a flowchart of illustrative process 1100 for generating personalized messages, in accordance with some embodiments of the present disclosure. In some embodiments, user device 900 may be used to perform the illustrative steps of process 1100.

Step 1102 includes control circuitry (e.g., control circuitry 904) receiving a message to transmit to a plurality of recipients. In some embodiments, a user may input a message (e.g., to user input interface 910, display 912 on a touchscreen, or both) of a user device. For example, a user may type a message on an electromechanical keyboard (e.g., a USB keyboard), or a touchscreen keyboard, or may speak a message to a microphone (e.g., of audio equipment 914) of a user device, and control circuitry (e.g., control circuitry 904) may identify words, commands, or phrases, and convert them to text. In an illustrative example, as shown in FIG. 7, a user may enter a message into a user device using a messaging application. In some embodiments, the control circuitry may generate a message that will be modified to broadcast to a plurality of recipients.

Step 1104 includes control circuitry (e.g., control circuitry 904) identifying a message format of the received message of step 1102. In some embodiments, the message format may include a text message (e.g., a SMS message), an email message (e.g., plaintext, or with embedded objects), a message in a messaging application, a social media message or post, any other suitable message, or any combination thereof.

Step 1106 includes control circuitry (e.g., control circuitry 904) receiving the plurality of recipients. In some embodiments, a user may specify each recipient from a list of recipients. For example, a user may select recipients from among a contact list displayed on a user device. In some embodiments, a user may select a predetermined group of recipients (e.g., a broad grouping, a narrow grouping, or any other grouping), having any suitable number of relationship types. The plurality of recipients may be specified as a list, for example. In some embodiments, the sending entity (e.g., a user or a device) may determine a list of recipients to receive a message.

Step 1108 includes control circuitry (e.g., control circuitry 904) determining recipient categories for each of the recipients. In some embodiments, each recipient is compared against a database of users (e.g., a relationship entity database) to determine a recipient category (e.g., a relationship). A recipient category may include a relationship identifier (e.g., coworker, boss, friend, family member, significant other, acquaintance, first friend group, second friend group), a grouping based on message preferences, any other suitable categorization, or any combination thereof. In some embodiments, the control circuitry (e.g., control circuitry 904) retrieves information from a server, database or other network device. For example, in some embodiments, the control circuitry provides a name to a database as input, and searches for s matching entry and then extracts the relationship type from the entry. In some embodiments, recipient categories may be stored on the user device. For example, in some embodiments, a contact list may include, for each contact, one or more categories to which that contact belongs.

Step 1110 includes control circuitry (e.g., control circuitry 904) determining whether a recipient category exists for the recipients. In some embodiments, for each recipient, the control circuitry (e.g., control circuitry 904) determines which recipient categories correspond to the recipient. A recipient may have one or more corresponding recipient categories (e.g., relationships), or may not have a corresponding recipient category. In some embodiments, the control circuitry need not determine a recipient category. For example, the control circuitry may determine to send the message as received to the recipient if no category is determined (e.g., the message is not personalized or otherwise customized).

Step 1112 includes control circuitry (e.g., control circuitry 904) validating existing recipient categories associated with recipients. In some embodiments, the control circuitry may determine that a recipient category is in agreement with an indicated category from a database or other suitable reference. In some embodiments, more than one recipient category may correspond to a recipient. In some such embodiments, the control circuitry may determine which recipient category to select for generating a message.

Step 1114 includes control circuitry (e.g., control circuitry 904) adding a new recipient category to a relationship entity database. In some embodiments, if no recipient category currently corresponds to a recipient, the control circuitry may determine a recipient category. For example, a message reconstructor may include a relationship analyzer that accesses historical communications records to determine a relationship. In some embodiments, a user may be prompted to enter a recipient category for a recipient not already assigned a category. In some embodiments, the control circuitry may perform any of the illustrative techniques described in the context of FIGS. 1-5 to determine and add a new recipient category based on relationship information.

Step 1116 includes control circuitry (e.g., control circuitry 904) determining reconstructed messages (e.g., personalized messages) for each of the recipient categories based on the recipient categories and the message format. For each recipient category, the control circuitry may determine a message format to apply, a message template to apply, a set of text, images, or video to apply, any other suitable edits to the message, or any combination thereof. In some embodiments, the control circuitry determines a reconstructed message for each recipient category. In some embodiments, the control circuitry determines a reconstructed message for each recipient. In some embodiments, a message reconstructor determines an appropriate plug-in, application, module, or combination thereof to use for generating a personalized message. For each recipient or recipient category, the message reconstructor identifies aspects of the message that can be personalized. For example, the message reconstructor may access a predetermined database for this purpose. The message reconstructor may, for example, access a relationship entity database to determine personalization options for the recipient. The message reconstructor then generates the personalized message for transmittal. In some embodiments, the message reconstructor may generate personalized messages in parallel, in series, or a combination thereof. For example, a text plug-in may be configured to insert salutations, insert emojis, change fonts, change language, change wording, or a combination thereof. In a further example, an image plug-in may be configured to change texts in images, change background colors, change attached images, or a combination thereof. In a further example, a video plug-in may be configured to insert customized texts (e.g., an overlay) to a video message, insert a video clip in a text message, or a combination thereof. Reconstructed messages may be stored in storage (e.g., storage 908) of a user device, any other suitable storage, or any combination thereof.

Step 1118 includes control circuitry (e.g., control circuitry 904) generating for transmission the reconstructed messages. In some embodiments, the control circuitry generates the reconstructed messages for transmission in series, one after another. In some embodiments, at least one of the reconstructed messages may be of a different type. For example, some the reconstructed messages may be SMS messages while other messages may be email messages. The control circuitry may generate for transmission all messages of a particular type first, and then proceed to generate messages of a different type for transmission. In some embodiments, reconstructed messages are generated for broadcast transmission, posting (e.g., on a social media page or feed), instant messaging, transmission to a message server, or a combination thereof.

In an illustrative example of process 1100, a message reconstructor receives a message from a user to transmit to a plurality of recipients. For each respective recipient of the plurality of recipients, the message reconstructor identifies a respective relationship identifier between the user and the respective recipient, determines one or more modifiers to apply to the message based on the respective relationship identifier, determines a respective reconstructed message corresponding to the relationship identifier based on the one or more modifiers and the message, and generates the respective reconstructed message for transmission over a network. In some embodiments, identifying each respective relationship identifier includes accessing historical communications records stored in a database. In some embodiments, for example, the historical communications records include one of a stored chat group record, a stored contacts list, a stored text message record, a stored email message record, a stored social media post record, and a stored comments record corresponding to a media content item. In some embodiments, the message reconstructor extracts one or more patterns of conversation from the historical communications records, determines a relationship identifier based on the one or more patterns of conversation, and stores the relationship identifier in a database. In some embodiments, determining the one or more modifiers includes determining a modification to one of a salutation, a closing, and a displayed object. In some embodiments, determining the one or more modifiers includes determining one or more message templates to apply to the message. For example, determining the one or more message templates may include identifying an object in the message, determining a contextual indicator based at least in part on the object, and modifying one or more of a word, an emoticon, and a visual attribute of the message based on the contextual indicator. In an illustrative example, the one or more modifiers may include one of a text modifier, an image modifier, and a video modifier. In some embodiments, identifying the respective relationship identifier is based at least in part on the plurality of recipients. In some embodiments, for example, the relationship identifier includes a first identifier corresponding to a broad grouping of users, and the relationship identifier also includes a second identifier corresponding to a narrow grouping of users.

Figure 12:
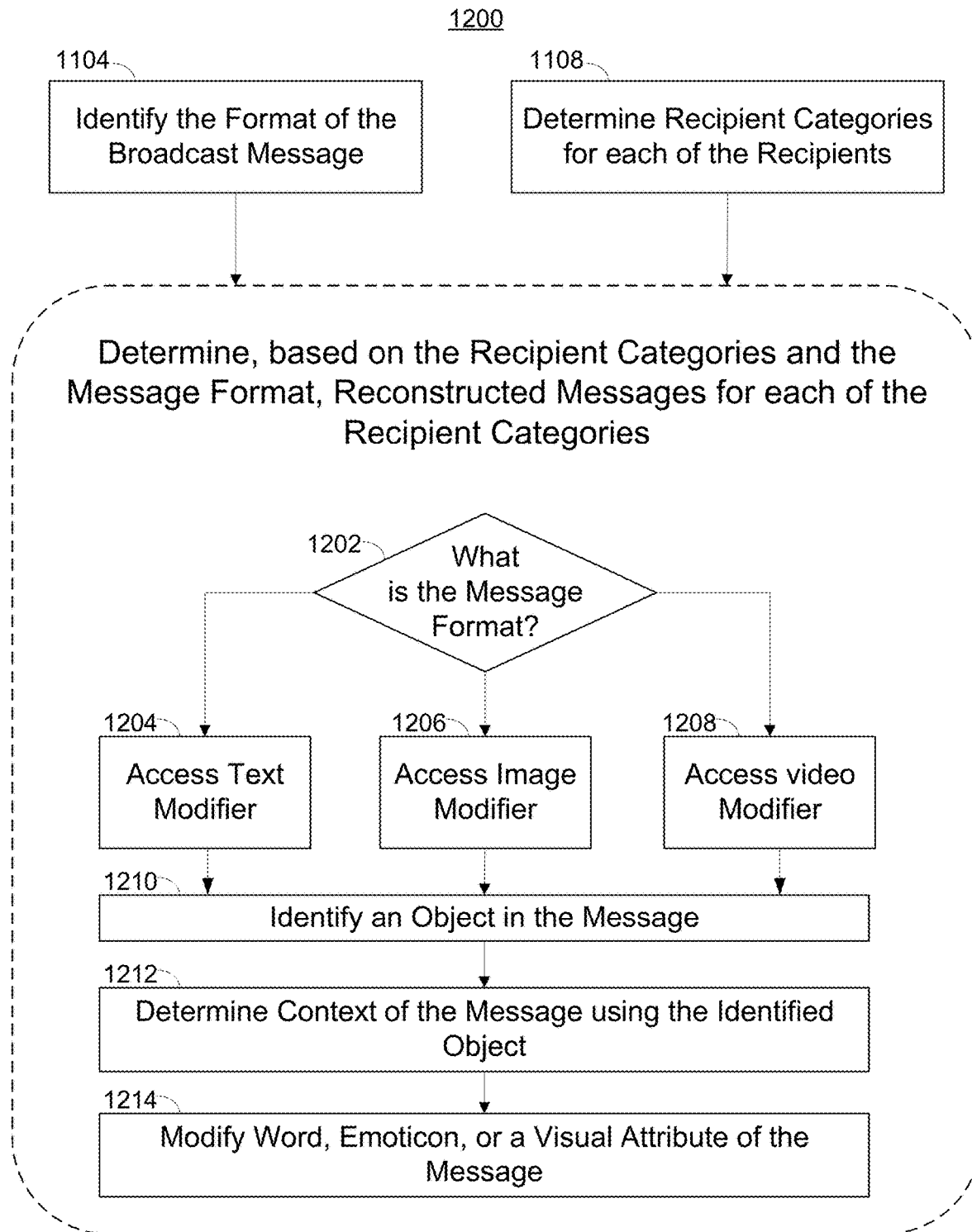
FIG. 12 shows a flowchart of an illustrative process for reconstructing messages based on recipient, in accordance with some embodiments of the present disclosure.

FIG. 12 shows a flow chart of illustrative process 1200 for reconstructing messages based on recipient, in accordance with some embodiments of the present disclosure. As illustrated, steps 1104 and 1108 are included in process 1200. Steps 1104 and 1108 are described more fully in the context of FIG. 11.

Step 1202 includes control circuitry (e.g., control circuitry 904) determining the message format of a received message. The control circuitry may determine the message format based on the message itself, a template, a recipient category (e.g., a relationship), any other suitable information, or any combination thereof. For example, a message constructor may determine a message format is {salutation; original message; emoji; text}. In a further example, the message reconstructor may select a template from among a plurality of templates for formatting the message. In some embodiments, determining a format of the message includes determining a type of message. For example, a type may include a greeting, a holiday wish, an invitation, a congratulatory statement, an apology, an announcement, a question, a caption (e.g., to accompany an image or video), a social media post, any other suitable type of message, or any combination thereof. In some embodiments, the message reconstructor determines the message format based on the content of the received message. For example, the message reconstructor may identify a holiday name, a keyword, or other identifier and then determine a format based on the identifying.

Steps 1204, 1206, and 1208 include the message reconstructor accessing a plug-in, application, functionality, or combination thereof based on the message format. For example, if the message format is text, the message reconstructor may access a text modifier to identify, and optionally modify, text of the message. In some embodiments, the message reconstructor performs all of steps 1204, 1206, and 1208 to identify different types of objects in a message. The message reconstructor may perform any or all of steps 1204, 1206, and 1208. In some embodiments, the message reconstructor need not perform step 1202, and may proceed to access one or more modifiers to identify object(s) in the received message without first determining a format.

Step 1204 includes control circuitry (e.g., control circuitry 904) accessing a text modifier. If the message reconstructor determines that the message format includes text, then the message reconstructor may access a text modifier to identify, add, remove, or otherwise modify text of the message to generate a reconstructed message. In some embodiments, the text modifier includes a replacement word (e.g., with a synonym), an abbreviation of a word, an altered spelling of a word, or other modification to one or more words or phrases of the message. For example, the received message may be "Happy New Year!" and the text modifier may replace the text with "Happy NYE" based on previous messages sent by the user for recipient category "Friend."

Step 1206 includes control circuitry (e.g., control circuitry 904) accessing an image modifier. If the message reconstructor determines that the message format includes one or more images, then the message reconstructor may access the image modifier to identify, add, remove, or otherwise modify an image of the message to generate a reconstructed message. In some embodiments, messages intended for recipients of a particular category are reconstructed with an image. For example, the image may include a comical image with an overlaid caption shared among friends. In a further example, the image may include an image of the sending entity (e.g., from an image gallery stored on a sending user's user device). In a further example, the image may include a work-related logo, a sports-related logo, a shared picture, any other suitable image, or any combination thereof. In some embodiments, the image may be selected based on the message. For example, if a keyword is identified in the message that corresponds to a holiday, an image corresponding to the holiday may be inserted in the message. In some embodiments, the user may have predetermined images to include in messages to particular recipients. For example, each contact of a stored contact list may have one or more corresponding images stored, which are included in messages to that contact.

Step 1208 includes control circuitry (e.g., control circuitry 904) accessing a video modifier. If the message reconstructor determines that the message format includes one or more videos, then the message reconstructor may access the video modifier to identify, add, remove, or otherwise modify a video of the message to generate a reconstructed message. In some embodiments, messages intended for recipients of a particular category are reconstructed with a video. For example, the video may include a comical video clip with an overlaid caption shared among friends. In a further example, the video may include a video clip of the sending user (e.g., from a video gallery stored on the sending user's user device). In some embodiments, the video may be selected based on the message. For example, if a keyword is identified in the message that corresponds to a holiday, a video corresponding to the holiday may be inserted in the message. In some embodiments, the user may have predetermined videos to include in messages to particular recipients. For example, each contact of a stored contact list may have one or more corresponding videos stored, which are included in messages to that contact.

Step 1210 includes control circuitry (e.g., control circuitry 904) identifying an object in the message. In some embodiments, the message reconstructor identifies an object such as a word, a phrase, an emoticon (e.g., generated from text or punctuation characters), an emoji (e.g., a character image), an image, an icon, a video, any other suitable object, or any combination thereof. In some embodiments, the message reconstructor identifies an object in the received message using the text modifier, image modifier, or video modifier of steps 1204, 1206, and 1208, respectively. For example, a received message may include an emoji, and the message reconstructor may determine that an intended recipient category for one recipient is "Supervisor." The message reconstructor may access the text modifier to remove the emoji, thus tailoring the message for a work supervisor. In some embodiments, the message reconstructor adds, removes, replaces, or otherwise modifies the object based on a recipient category, the type of the object, the message content, a selected message format, a selected message template, any other suitable criterion, or any combination thereof. In some embodiments, the message reconstructor parses the received message to determine all objects in the message, and then evaluates each object. In some embodiments, step 1210 may be performed at the same time as step 1202. For example, a message format may be determined based on one or more identified objects. To illustrate, text of the message may be identified as a seasonal greeting, and the message format may be determined to be text-based.

Step 1212 includes control circuitry (e.g., control circuitry 904) determining context of the message using the identified object. In some embodiments, the message reconstructor may determine how to format customized messages based on identified objects. In some embodiments, the context may include recipient-specific information, time-and-date specific information, platform-specific information, message-specific information, any other indicator of context, or any combination thereof. For example, context may include an event, comment, image, or video relevant to a recipient. For example, if a message includes a seasonal greeting, and the date is near a recipient's birthday, the message reconstructor may determine that birthday-related text should be included in the message (e.g., a "and Happy Birthday!" sign-off at the end of the message). Context may include information from a recipient's social media, the recipient's communications history, information stored about the recipient on the sending user's device, metadata associated with the recipient, any other suitable information, or any combination thereof.

Step 1214 includes control circuitry (e.g., control circuitry 904) modifying a word, text, image, emoji, emoticon, video, or any other visual attribute of the message. In some embodiments, based on the message format, identified objects, and context, the message reconstructor modifies one or more aspects of the message to generate a reconstructed message. In some embodiments, a text modifier, an image modifier, a video modifier, or a combination thereof includes a dictionary of text, images, and videos, or modifications thereof, that may be included in a message intended to be sent to a recipient of the recipient list. Modification may include, for example, addition, removal, replacement, or other modification of an object or visual attribute.

In some embodiments, for example, the message reconstructor receives a message, identifies the message format and context for each recipient, and identifies one or more objects in the message. In some embodiments, the message reconstructor determines whether any objects of a message need to be modified, and if not, the received message is transmitted to one or more recipients without modification. In some embodiments, the message format is used to determine what objects may be included in a reconstructed message.

Figure 13:
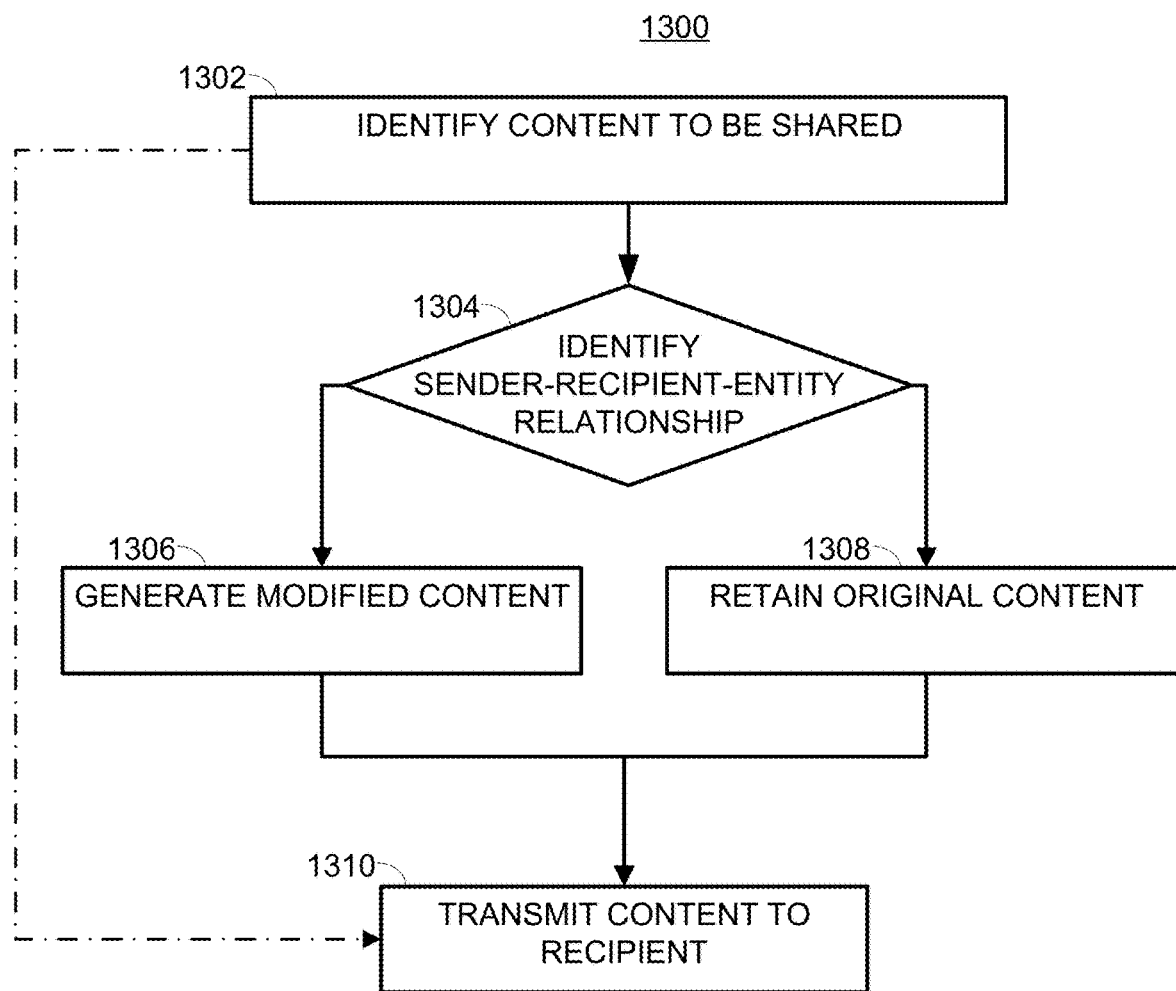
FIG. 13 shows a flowchart of an illustrative process for sharing content based on relationship information, in accordance with some embodiments of the present disclosure.

FIG. 13 shows a flowchart of illustrative process 1300 for sharing content based on relationship information, in accordance with some embodiments of the present disclosure. The illustrative steps of process 1300 may by performed by any suitable control circuitry, implemented as part of any suitable device or combination of devices (e.g., any of the illustrative systems and devices of FIGS. 1-10). For example, user device 900 may be used to perform the illustrative steps of process 1300.

At step 1302, the control circuitry identifies content to be shared. The content may include one or more content items, or identifiers associated with one or more content items. In an illustrative example, referencing FIG. 4, content analyzer 450 may be configured to receive message 410, which may include links to, or otherwise be associated with, one or more content items. In some embodiments, the control circuitry need not receive an indication of content, or a message indicating or referring to content, to identify content.

At step 1304, the control circuitry identifies sender-recipient-entity relationship information. In some embodiments, the control circuitry determines whether to modify one or more content items, one or more messages, or both, based on the relationship information. In some embodiments, determining whether to generate the modified content item based on the relationship information includes retrieving the relationship information from a database, determining a relationship identifier based on the relationship information, and determining whether to generate the modified content item based on the relationship identifier. For example, the control circuitry may identify a relationship between the identified entity and the recipient, or sender, as "event-participant" and apply a modification based on predetermined rules for modifying messages having event-participant relationship between the entity (e.g., the event in this illustrative example) and recipient or sender. The control circuitry may apply one or more templates that govern for which relationship types modifications are made, and which modifications are made.

At step 1306, the control circuitry generates modified content. In some embodiments, the control circuitry determines at step 1304 to generate modified content. The control circuitry may, for example, annotate a content item, add contextual information to a message (e.g., inserting text), generate a message having contextual information, caption a content item (e.g., insert text over an image or video), insert a graphic into a message or over content (e.g., insert a thumbnail image, icon, or other visual object), highlight text in a message (e.g., highlight a reference to an entity in a message to improve prominence), perform any other suitable modification, or any combination thereof.

At step 1308, the control circuitry retains the original content (i.e., does not modify the original content). In some embodiments, the control circuitry determines at step 1304 to retain original content. The control circuitry may forward the content item, message, or both, unaltered to the recipient. In some embodiments, the control circuitry may generate a metadata tag indicating that no modification was made, no modification is relevant, or otherwise modification need not be made.

At step 1310, the control circuitry transmits content to the recipient. The transmitted content may include modified content, original content, a modified message, an original message, or any combination thereof. In an illustrative example, referencing FIG. 4, content analyzer 450 may be configured to transmit transmitted message 460, which may include links to, or otherwise be associated with, modified content generated at step 1310. In some embodiments, the control circuitry may transmit the content item (e.g., or a link thereto), the message, both to the recipient using a communications network and any suitable communications protocol.

In an illustrative example, each time a user shares a content item, the control circuitry may check whether a personalized version of the content item is already being circulated or is otherwise stored. If a personalized version is not available, the control circuitry may determine options for personalization. In some circumstances, the user sharing the content is the actor (e.g., a user sharing a photo of themselves or an article about themselves), the recipient user is the actor (e.g., user A sends a picture of user B to user B), the user sharing the content is a proxy owner of the content as determined by the relationship database (e.g., the sender is a parent of a child sharing the content, the sender is a content service on which the content item is posted), the destination user is the proxy owner of the content as determined by the relationship database (e.g., the recipient is a parent of a child receiving the content, the recipient is a content service on which the content item is posted), or a combination thereof. In some embodiments, the content is modified (e.g., re-curated) to focus on the actors associated with the content at the time the content is shared (e.g., when the message is sent). Any modifications may be retained to maintain context (e.g., as described in the context of content classification engine 520), and stored in suitable memory storage (e.g., classified content database 530).

Figure 14:
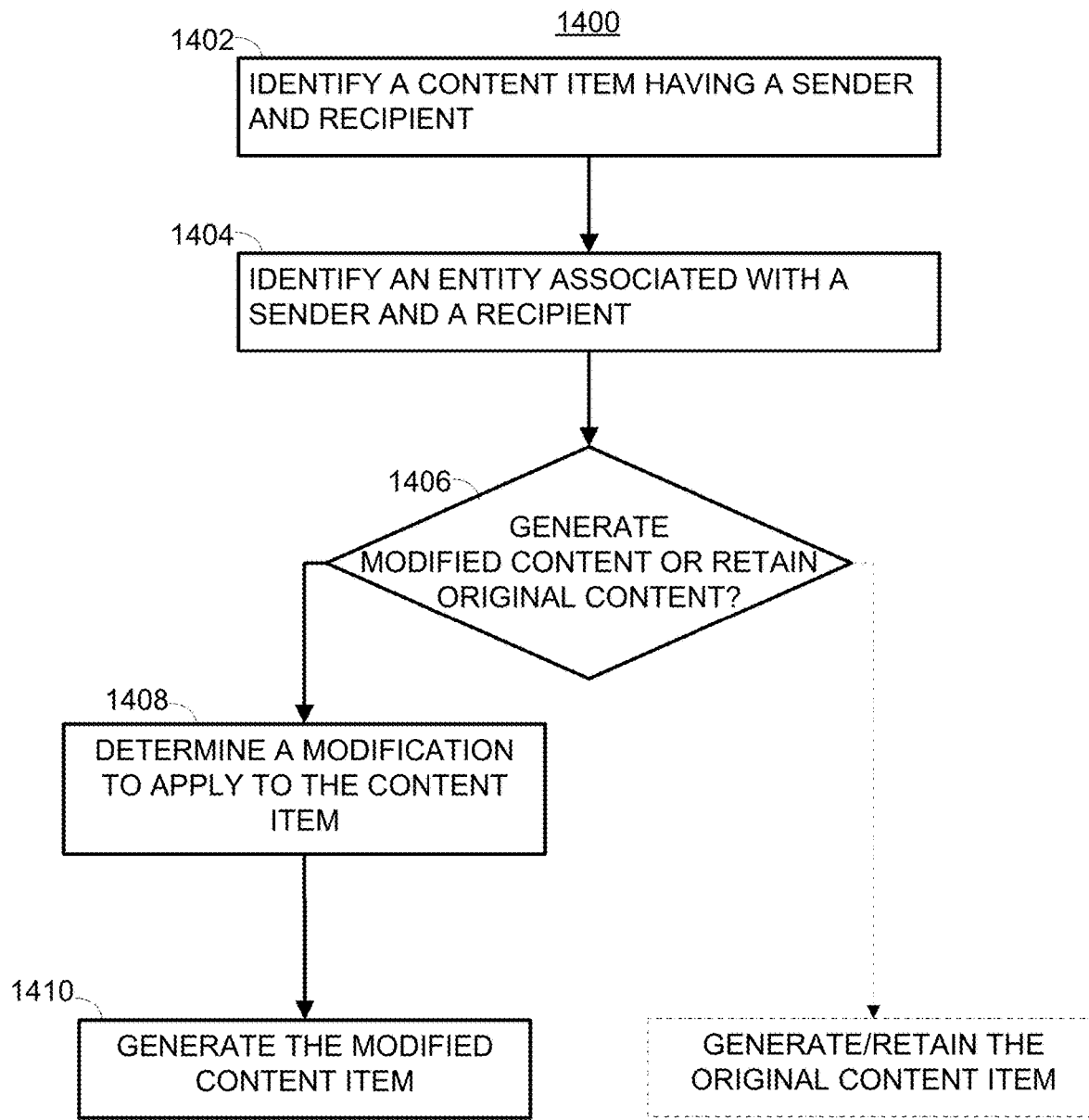
FIG. 14 shows a flowchart of an illustrative process for modifying a content item based on recipient and content, in accordance with some embodiments of the present disclosure.

FIG. 14 shows a flowchart of illustrative process 1400 for modifying a content item based on recipient and content, in accordance with some embodiments of the present disclosure. For example, user device 900 may be used to perform the illustrative steps of process 1400. In a further example, process 1300 may be performed by content analyzer 450 of FIG. 4. Content analyzer 450 may perform some of, or all of, steps 1302, 1304, 1306, 1308, and 1310.

At step 1402, the control circuitry identifies a content item having a sender and a recipient. In some embodiments, the content item is received based on user input to a user interface (e.g., user input interface 910 of FIG. 9). For example, a user may indicate a desire to share a content item by selecting a soft button (e.g., a "share," "send" or "post" command). In some embodiments, the content item may be identified or selected by the control circuitry irrespective of user input. For example, the control circuitry may implement a social media networking forum and may generate a command to share popular content, or trending content, with one or more users. In some embodiments, the control circuitry receives an identifier associated with the content item (e.g., a URL linked to a datafile), the content item (e.g., the datafile), metadata associated with the content item (e.g., stored with, as part of, or apart from, the datafile), any other suitable information, or any combination thereof. In some embodiments, the control circuitry receives a message from a sender, intended for a recipient, and the message may include a link, identifier, attachment, or other association with the content item.

At step 1404, the control circuitry identifies an entity associated with the content item. The control circuitry may apply any suitable technique, such as those described in the context of FIGS. 1-5, to identify the entity. The control circuitry may apply object identification, natural language processing, location identification, genre identification, any other suitable technique, or any combination thereof. In some embodiments, identifying the entity associated with the content item includes identifying text associated with the content item, and analyzing the text to identify the entity. For example, the control circuitry may identify text associated with the content item and apply keyword recognition, entity extraction, natural language processing, or any other suitable technique to identify entities represented in, referred to in, or otherwise indicated in the text. In some embodiments, identifying the entity associated with the content item includes identifying one or more objects associated with the content item, and analyzing the one or more objects to identify the entity. For example, the control circuitry may identify one or more objects such as images (e.g., graphics, pictures, photographs, or any other suitable format of image), captions (e.g., embedded text, accompanying text, phrases included in metadata), videos (e.g., clips, GIFs, animations), links, identifiers (e.g., network addresses, hardware addresses, email addresses, handles, usernames, alphanumeric codes). In a further example, the control circuitry may apply one or more templates to a message to identify an object, wherein the templates may include a set of rules, arrangements, references, or other information for comparing with a message to extract objects. In some embodiments, identifying the entity associated with the content item includes identifying a geographic location associated with content item, and identifying the entity based on the geographic location. For example, the control circuitry may identify a geographic tag stored in metadata associated with the content item, and compare the geographic tag with tags associated with one or more entities to find a match.

At step 1406, the control circuitry determines whether to generate a modified content item based on relationship information associated with the entity. In some embodiments, the control circuitry determines either to modify or not to modify the content item. In some embodiments, the control circuitry determines which modification to apply, and if modifications are to be applied then how to apply the modification. In some embodiments, determining whether to generate the modified content item based on the relationship information includes retrieving the relationship information from a database, determining a relationship identifier based on the relationship information, and determining whether to generate the modified content item based on the relationship identifier. For example, the control circuitry may identify a relationship between the identified entity and the recipient, or sender, as "sibling-sibling" and apply a modification based on predetermined rules for modifying messages having sibling-sibling relationship between the entity and recipient or sender. The control circuitry may apply one or more templates that govern for which relationship types modifications are made, and which modifications are made.

At step 1408, the control circuitry determines a modification to apply to the content item to generate the modified content item, if it is determined to generate the modified content item at step 1406. In some embodiments, the modification includes a visual indicator indicative of the entity identified at step 1404. For example, in some embodiments, the visual indicator includes text indicative of the entity. For example, the visual indicator may be indicative of the context information.

In some embodiments, at step 1408, the control circuitry determines the modification to apply to the content item by analyzing the content item to determine context information. In some embodiments, the context information includes one or more keywords associated with the content item. For example, the control circuitry may determine an event, a location, a genre, a type, or any other categorization that may provide context as to what is included in the content item and the relevance of the content item. In some embodiments, the control circuitry may generate text to accompany the content item. For example, a message associated with the content item may be modified to include text that includes contextual information. In a further example, wherein content was originally sent without commentary or a message, the control circuitry may generate a message that includes entity identifiers (e.g., names, locations, events, times, dates, and other information). In a further example, a caption may be added to a photo or video that indicates which entities are in the photo or video, which entities are indicated in metadata tags associated with the content item, the spatial location or temporal location of the entities in the content item, or a combination thereof.

At step 1410, the control circuitry generates the modified content item (e.g., for output on an output device). Output may include, for example, generating a display based on the modified content item (e.g., displaying the content item on a display device), storing the modified content item and any suitable metadata in memory storage of one or more suitable devices, transmitting the modified content item and any suitable metadata across a network or other communications link to one or more other devices (e.g., network devices, user devices, or both), generating any other suitable output, or any combination thereof.

In some embodiments, if it is determined to not generate the modified content item at step 1406, the control circuitry generates for output the content item as received at step 1402. For example, in some embodiments, the control circuitry generates for transmission over a communications network the original content item, if it is determined to not generate the modified content item.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
    receiving a text message at an electronic device;
    identifying a first recipient and a second recipient to whom the received text message is to be transmitted;
    determining that the first recipient is associated with a first relationship category and the second recipient is associated with a second relationship category that is distinct from the first relationship category;
    modifying language of the text message into a first format and a second format, wherein the first format and is determined based on the first relationship category and the second format is determined based on the second relationship category; and
    transmitting the text message with the modified language in the first format to the first recipient and the text message with the modified language in the second format to the second recipient.

2. The method of claim 1, further comprising:
determining that the received text message includes an image; and
in response to determining that the received text message includes an image, selecting, by a message reconstructor, an image modifier from a plurality of modifiers, for modifying the text message, wherein the selection of the image modifier is based on format of the received message.

3. The method of claim 2, further comprising:
determining, based on the first relationship category and the second relationship category, that the image included in the received text message is inappropriate for the first recipient but not for the second recipient; and
in response to determining that the image included in the received text message is inappropriate for the first recipient but not for the second recipient:
removing the image from the text message with the modified language in the first format; and
transmitting, to the first recipient, the text message with the modified language in the first format, without the received image.

4. The method of claim 3, further comprising:
retaining the image with the text message with the modified language in the second format; and
transmitting to the second recipient, the text message with the modified language in the second format, with the received image.

5. The method of claim 1, wherein the first relationship category is a formal category used for professional relationships.

6. The method of claim 1, wherein the second relationship category is an informal category used for non-professional relationships.

7. The method of claim 1, further comprising:
configuring an image plug-in for processing the received text message; and
using the image plug-in to change attributes of the text message that is to be transmitting in the first and second formats.

8. The method of claim 7, wherein the attributes to be changed include colors and background of the received text message.

9. The method of claim 1, further comprising:
configuring a video plug-in for processing the received text message; and
using the video plug-in to overlay a video message on the text message that is to be transmitting in the first and second formats.

10. The method of claim 1, further comprising:
determining that the received text message includes a keyword and an image;
modifying the image based on a context of the keyword in the text message; and
transmitting the text message with the modified language in the first format to the first recipient and the text message with the modified language in the second format to the second recipient with the modified image.

11. A system comprising:
control circuitry configured to:
receive a text message at an electronic device;
identify a first recipient and a second recipient to whom the received text message is to be transmitted;
determine that the first recipient is associated with a first relationship category and the second recipient is associated with a second relationship category that is distinct from the first relationship category;
modify language of the text message into a first format and a second format, wherein the first format and is determined based on the first relationship category and the second format is determined based on the second relationship category; and
transmit the text message with the modified language in the first format to the first recipient and the text message with the modified language in the second format to the second recipient.

12. The system of claim 11, further comprising, the control circuitry configured to:
determine that the received text message includes an image; and
in response to determining that the received text message includes an image, select, by a message reconstructor, an image modifier from a plurality of modifiers, for modifying the text message, wherein the selection of the image modifier is based on format of the received message.

13. The system of claim 12, further comprising, the control circuitry configured to:
determine, based on the first relationship category and the second relationship category, that the image included in the received text message is inappropriate for the first recipient but not for the second recipient; and
in response to determining that the image included in the received text message is inappropriate for the first recipient but not for the second recipient:
remove the image from the text message with the modified language in the first format; and
transmit, to the first recipient, the text message with the modified language in the first format, without the received image.

14. The system of claim 13, further comprising, the control circuitry configured to:
retain the image with the text message with the modified language in the second format; and
transmit to the second recipient, the text message with the modified language in the second format, with the received image.

15. The system of claim 11, wherein the first relationship category is a formal category used for professional relationships.

16. The system of claim 11, wherein the second relationship category is an informal category used for non-professional relationships.

17. The system of claim 11, further comprising, the control circuitry configured to:
configure an image plug-in for processing the received text message; and
use the image plug-in to change attributes of the text message that is to be transmitting in the first and second formats.

18. The system of claim 17, wherein the attributes to be changed include colors and background of the received text message.

19. The system of claim 11, further comprising, the control circuitry configured to:
configure a video plug-in for processing the received text message; and
use the video plug-in to overlay a video message on the text message that is to be transmitting in the first and second formats.

20. The system of claim 11, further comprising, the control circuitry configured to:
- determine that the received text message includes a keyword and an image;
- modify the image based on a context of the keyword in the text message; and
- transmit the text message with the modified language in the first format to the first recipient and the text message with the modified language in the second format to the second recipient with the modified image.

* * * * *